US009384145B2

(12) United States Patent
Gura et al.

(10) Patent No.: US 9,384,145 B2
(45) Date of Patent: *Jul. 5, 2016

(54) SYSTEMS AND METHODS FOR IMPLEMENTING DYNAMICALLY CONFIGURABLE PERFECT HASH TABLES

(71) Applicant: Oracle International Corporation, Redwood City, CA (US)

(72) Inventors: Nils Gura, Mountain View, CA (US); Guy L. Steele, Jr., Lexington, MA (US); David R. Chase, Belmont, MA (US)

(73) Assignee: Oracle International Corporation, Redwood City, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 14/010,183

(22) Filed: Aug. 26, 2013

(65) Prior Publication Data
US 2015/0058595 A1    Feb. 26, 2015

(51) Int. Cl.
*G06F 7/38*    (2006.01)
*G06F 12/10*    (2016.01)

(52) U.S. Cl.
CPC ................................. *G06F 12/1018* (2013.01)

(58) Field of Classification Search
None
See application file for complete search history.

(56) References Cited

U.S. PATENT DOCUMENTS

| | | | | |
|---|---|---|---|---|
| 6,434,662 | B1* | 8/2002 | Greene et al. | 711/108 |
| 7,409,526 | B1* | 8/2008 | Ng et al. | 711/216 |
| 8,244,909 | B1* | 8/2012 | Hanson et al. | 709/238 |
| 2009/0240913 | A1* | 9/2009 | Obana et al. | 711/216 |
| 2015/0058595 | A1* | 2/2015 | Gura et al. | 711/206 |
| 2015/0120754 | A1* | 4/2015 | Chase et al. | 707/747 |
| 2015/0121034 | A1* | 4/2015 | Steele et al. | 711/216 |
| 2015/0121035 | A1* | 4/2015 | Steele et al. | 711/216 |
| 2015/0169467 | A1* | 6/2015 | Chase et al. | 711/216 |

OTHER PUBLICATIONS

"An Optimal Algorithm for Generating Minimal Perfect Hash Functions" Zbigniew J. Czech, George Havas, Bohdan S. Majewski, Oct. 1992, pp. 1-12.
"CMPH-C Minimal Perfect Hashing Library" downloaded Aug. 23, 2013 from cmph.sourceforge.net pp. 1-5.
"Error Correcting Codes, Perfect Hashing Circuits, and Deterministic Dynamic Dictionaries", Peter Bro Miltersen, Jun. 1997, pp. 1-22.
F. C. Botelho, D. Menoti, N. Ziviani. A New algorithm for constructing minimal perfect hash functions,Technical Report TR004/04, Department of Computer Science, Federal University of Minas Gerais, 2004. Oct. 2004, pp. 1-13.
Oded Goldreich and Avi Wigderson. 2011. On the circuit complexity of perfect hashing. In Studies in complexity and cryptography, Oded Goldreich (Ed.). Springer-Verlag, Berlin, Heidelberg, pp. 26-29.

\* cited by examiner

*Primary Examiner* — David H Malzahn
(74) *Attorney, Agent, or Firm* — Robert C. Kowert; Meyertons, Hood, Kivlin, Kowert & Goetzel, P.C.

(57) ABSTRACT

Hardware circuitry may evaluate minimal perfect hash functions mapping keys to addresses in lookup tables. The circuitry may include primary hash function sub-circuits that apply linear hash functions to input key values (using carry-free arithmetic) to produce primary hash values. Each sub-circuit may multiply bit vectors representing key values by a bit matrix and add a constant bit vector to the result. The circuitry may include a secondary hash function sub-circuit that generates secondary hash values by aggregating values associated with multiple primary hash values using signed, unsigned, or modular integer addition, or bit-wise XOR operations. Secondary hash values may be usable to access data values in the lookup table that are associated with particular input key values. The circuitry may determine the validity of input keys and may alter the configuration or contents of the lookup tables. The hash function sub-circuits may include programmable hash tables.

20 Claims, 15 Drawing Sheets

SYSTEMS AND METHODS FOR IMPLEMENTING DYNAMICALLY CONFIGURABLE PERFECT HASH TABLES

BACKGROUND

1. Field of the Disclosure

This disclosure relates generally to computing devices that implement lookup tables, and more particularly to systems and methods for implementing configurable perfect hash tables using hardware circuitry.

2. Description of the Related Art

Computer networking devices such as routers, switches, and network interface cards commonly rely on lookup tables in hardware circuitry to quickly access information associated with incoming data packets for purposes such as routing, filtering, or load-balancing. Lookup tables for network applications allow for the fast retrieval of data values associated with a key, where the key is a bit string that can be found in or computed based on data received in incoming packets. Lookup tables can map a set of such keys to a set of addresses in a memory holding data associated with the keys.

Many existing hardware approaches focus on lookup tables that solve the longest-prefix match problem, specifically for IP routing applications. Such approaches typically assume fixed key sizes and a static/fixed set of tables with fixed-size entries, and they typically emphasize high lookup rates over low latency for individual lookups. For example, some traditional hardware implementations of lookup tables include content-addressable memories (CAMs) or, more specifically, ternary content-addressable memories (TCAMs). CAMs are dedicated hardware circuits combining memory locations for key entries with comparator logic such that a given input key can be quickly compared to all key entries stored in the memory in parallel. If an input key is found, the CAM either directly returns data associated with the key or the index of the memory location the matching key is stored in. This index can then be used to access data associated with the key, for example, by using the index as an address into a separate static random access memory (SRAM) or a dynamic random access memory (DRAM).

TCAMs allow key entries to not only use bit values of 0 and 1, but a third, "don't care" value, X. A value of X specifies that the corresponding bit position is not to be compared to the input key, but is to be considered a match. Some applications require that, in case of multiple matches, the entry with the longest sequence of matching, non-X bits starting from the most significant bit, commonly known as the longest-prefix match, to be the entry that is returned. While TCAMs offer low access latencies, their memory capacity is generally lower than the capacities offered by standard SRAMs of equal chip size. This is largely due to the added comparator logic per memory location. Furthermore, the power consumption of TCAMs tends to be high, and the hardware design dictates a maximum key size.

Some more recent hardware implementations of large lookup tables targeted at solving the longest-prefix match problem leverage standard SRAM technology. These implementations often utilize tree-based data structures such as TRIEs (which are also known as digital trees or prefix trees) stored in SRAMs. In some existing implementations, TRIEs map the digits of the keys to nodes in a tree structure such that the lookup of a key is done by traversing the tree from its root to its leaf nodes, such that at every node, the next digit in the input key determines the next-level node until a leaf node is reached. The traversal of the tree for key lookups may require multiple accesses to SRAM memory. For example, for m-bit keys, TRIEs require O(m) memory accesses in the worst case. By using multiple SRAMs and techniques such as pipelining, tree-based implementations can match or exceed the lookup rates offered by TCAMs. On the other hand, approaches that depend on multiple SRAM accesses commonly lead to significantly higher latencies for individual key lookups.

Existing software approaches, including software algorithms for evaluating perfect hash tables, provide more flexibility than existing hardware approaches in terms of the number of tables, key sizes, and data entry sizes. However, these algorithms are typically designed for sequential processing (e.g. as a sequence of processor instructions), and do not lead to efficient, parallel circuit implementations. For example, software techniques for fast lookups commonly include data structures such as hash tables or, more specifically, perfect hash tables. However, existing software algorithms for key lookups typically do not yield practical hardware implementations of lookup tables, as they often require long sequences of steps, sequential integer arithmetic, and/or conditional processing, i.e., properties that do not allow for efficient parallel or pipelined processing in hardware.

SUMMARY

The system and methods described herein may in some embodiments implement dynamically configurable perfect hash tables that provide low-latency access to data stored in memory. More specifically, the systems described herein may include hardware circuitry configured to implement evaluating minimal perfect hash functions that map a set of keys (e.g., bit strings) to a set of addresses in one or more lookup tables that hold data associated with the keys. In some embodiments, the minimal perfect hash functions that are implemented in the hardware circuitry may be selected for efficient evaluation in hardware circuitry, and these minimal perfect hash functions may be used to construct the lookup tables.

In some embodiments, the hardware circuitry may include two primary hash function sub-circuits, each of which may be configured to apply a respective linear hash function to each input key value to produce a respective primary hash value. Unlike in some existing minimal perfect hash function implementations, in some embodiments, the primary hash function sub-circuits described herein may be configured to perform hardware-friendly arithmetic (e.g., carry-free polynomial arithmetic, rather than integer arithmetic). For example, in some embodiments, each of the primary hash function sub-circuits may be configured to perform polynomial arithmetic over a Galois field (e.g., GF(2)). In some embodiments, each of the input key values may be represented by a bit vector and in applying a respective linear hash function to each input key value to produce a respective primary hash value, each of the primary hash function sub-circuits may be configured to multiply the bit vector by a pre-defined bit matrix and to add a pre-defined constant bit vector to the result of the multiplication.

In some embodiments, the hardware circuitry may also include a secondary hash function sub-circuit that is configured to receive the primary hash values produced by the two primary hash function sub-circuits for a given input key value, and to generate a secondary hash value dependent on those primary hash values, where the secondary hash value is usable to access a data value stored in the lookup table that is associated with the given input key value. For example, in some embodiments, the secondary hash function sub-circuit may be configured to obtain a respective value associated with each of the primary hash values (e.g., from a memory within the hardware circuitry) and to aggregate the obtained values using unsigned integer addition, signed integer addition, modular integer addition, or a bit-wise XOR operation.

In some embodiments, the primary and secondary hash functions may be pre-computed in software based on a fixed key set and representations of those hash functions may be transferred to primary and secondary hash tables in one or more memories within the hardware circuitry. The hardware circuitry may be configured to retrieve data associated with a given key that is presented as an input to the hardware circuitry. The hardware circuitry may be further configured to determine the validity of the keys that are presented as inputs. In some embodiments, transferring representations of the primary and secondary hash functions to the hash tables may include partitioning a memory into different regions into which the representations are to be stored, dependent on one or more of: a key size specified for the lookup table, a number of key values specified for the lookup table, a size specified for data values stored in the lookup table, a number of data values associated with each key value in the lookup table, or a value of a signal indicating whether received key values are to be validated by the evaluation circuit.

In some embodiments, the hash function evaluation circuits described herein may support multiple, software-configurable hash tables and/or lookup tables of variable key and data sizes, different ones of which may be selected for use with particular lookup operations. In some embodiments, the hash tables may be re-configured to provide different hash functions without modifying the underlying hardware of the hash function evaluation circuits. Similarly, in some embodiments, the configuration and/or contents of the lookup tables may be altered without modifying the underlying hardware of the hash function evaluation circuits.

Figure 1:
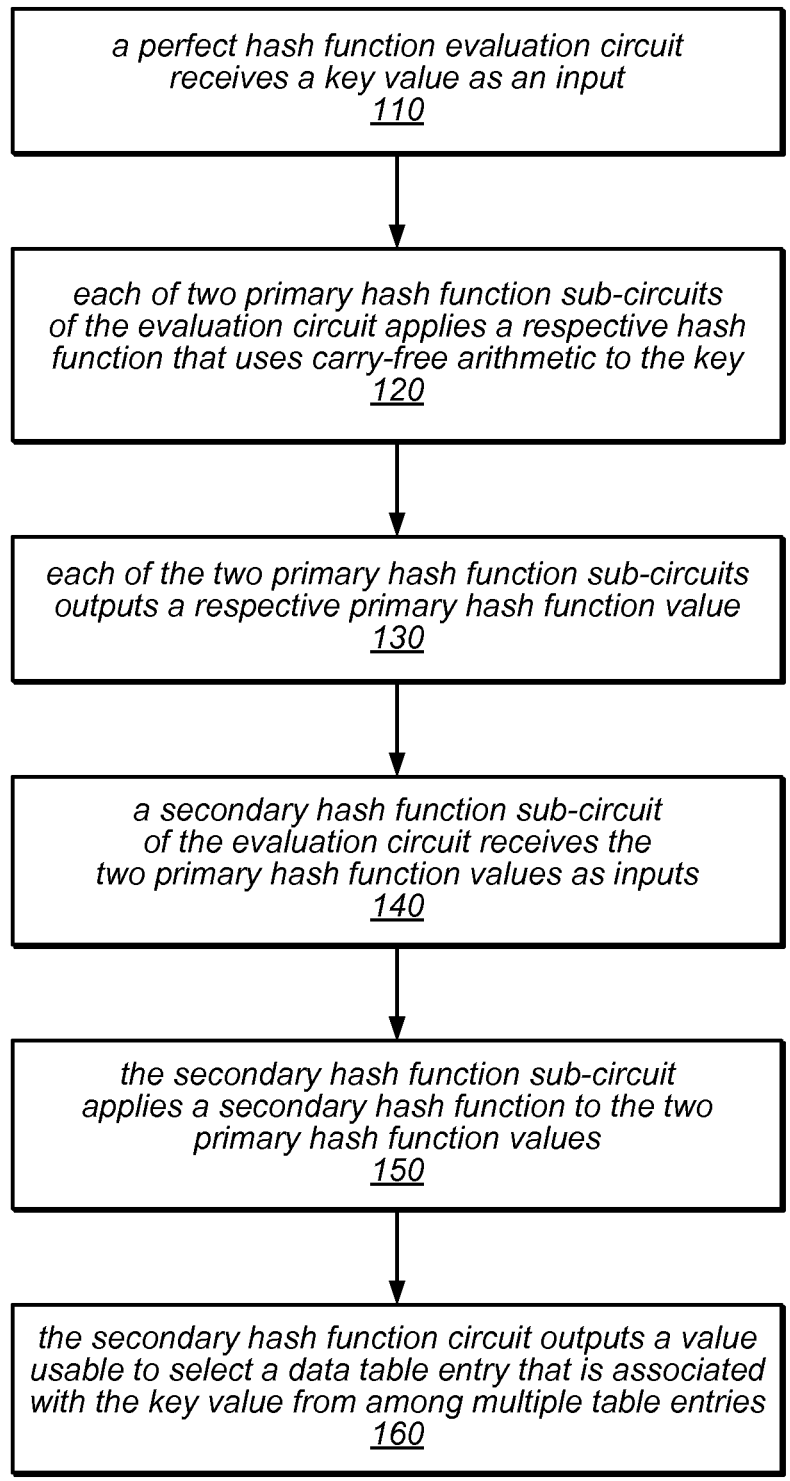
FIG. 1 is a flow diagram illustrating one embodiment of a method for evaluating a perfect hash function.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

The systems and methods described herein may, in various embodiments, be used to implement configuring perfect hash function circuitry and/or evaluating perfect hash functions using such circuits. More specifically, the systems described herein may utilize minimal perfect hash functions targeted at efficient evaluation in hardware circuitry to construct lookup tables. In some embodiments, the hash functions may be pre-computed in software based on a fixed key set and then transferred into a hardware circuit. The circuit may store a representation of the hash functions in one or more hash tables and may be configured to retrieve and return data that is associated with various keys when they are presented to the circuit as inputs. In some embodiments, the circuit may also verify the validity of a presented key and/or alter data associated with a presented key.

The hash function evaluation circuits described herein may be implemented in various circuit-level network processing devices including network interface cards, network processors, smart routers/switches, etc., according to different embodiments. For example, in some embodiments, these circuits may be implemented as part of an application-layer network device, such as a network device that is designed for low-latency processing of application messages in hardware. In general, the systems and methods described herein may be employed in a variety of applications that require the fast retrieval of information associated with at least one key per incoming message, in different embodiments.

In some embodiments, the system in which the circuits and techniques described herein are employed may be a user-programmable device. In such embodiments, the hash tables described herein may be generated based on a user-provided program and/or user-provided table data, which may not be known at circuit design time. In some embodiments, employing the circuits and techniques described herein may allow the user to create a variable number of hash tables, and each of the hash tables may support a different key size, a different number of keys, and/or differently-sized data entries associated with each key than other tables. This, in turn, may allow software to efficiently utilize the memory resources built into the circuit. In some embodiments, the user may define the various hash tables and/or lookup tables (including the valid keys for the table, the data associated with each of the valid keys, the maximum key size, the maximum number of keys supported, the number and/or size of the data words associated with the keys, and/or other parameters of the hash tables and/or lookup tables) in a domain-specific programming language. In other embodiments, the user may define a mapping between valid key values and associated data words (e.g., in a comma-separated values file), and program instructions may be used to determine the maximum key size, the number of keys supported, and the number and/or size of the data words associated with the keys, and to generate a hash function evaluation circuit configuration that implements a minimal perfect hash function based on that information (which may include one or more hash tables, as described herein).

One common application in which the hash function evaluation circuits and techniques described herein may be employed is the mapping of Internet Protocol (IP) addresses to Ethernet addresses for the purpose of routing IP packets to their destinations across multiple hops in the network. Given short packets and the high bandwidth of network links, in these types of applications, table lookups may need to be executed at a rate high enough to sustain the link rate. For example, a 10 Gb/s Ethernet link may have a maximum packet arrival rate of almost 15 million packets per second at minimum packet size, requiring 15 million table lookups per second to make routing decisions in a timely manner. For some such IP routing applications, the mapping of IP addresses to Ethernet addresses may not only require a determination of whether an IP address is held in the key memory, but whether there exists at least one key entry for which at least some of the bits (e.g., at least some of the most significant bits) matches the input key.

As noted above, existing hardware implementations of lookup tables for routing applications typically focus on high lookup rates, require solving the longest-prefix match problem, and often rely on fixed key and data entry sizes (as given by IP and Ethernet addresses). However, for applications in some computer networking devices, e.g., those examining incoming data packets beyond the network-layer header, lookup tables with different properties may be desirable. In particular, some applications may not require solving the longest-prefix match problem, but may require low, deterministic lookup latencies, a potentially large number of entries, and/or keys and/or data entries of variable sizes. In some applications, it may be desirable to be able to partition available memory resources into multiple tables of variable key and/or data sizes, e.g., to efficiently utilize those memory resources.

In some embodiments, the systems and methods described herein may address some or all of the aforementioned properties that are not provided (or that are insufficiently supported) by existing implementations of lookup tables designed for routing applications. The systems and methods described herein may efficiently perform table lookups in minimal perfect hash tables at low latency in hardware circuitry. In some design environments (e.g., those that utilize field programmable gate arrays, or FPGAs), high-density SRAMs may be readily available for use in implementing the techniques described herein, while the construction of CAMs would be costly in terms of resources.

A perfect hash function H for a set K of m unique keys of r bits is a mapping function that maps each key k∈K to a unique integer i=H(k). If the unique integers i are consecutive, e.g., 0≤i≤m−1 for all i, the mapping is called a minimal perfect hash function (MPHF). In some embodiments, given a perfect hash function H for a key set K, the lookup of data associated with a key k may first require the evaluation of H(k) to compute a unique index i. The index i may then be used as an address into a memory holding a d-bit data entry D(k) associated with k. In some embodiments, the systems and methods described herein may be used to implement, in hardware circuitry, perfect hash functions that can be evaluated in constant time for all keys k.

In some embodiments, the computation for looking up a key k using a perfect hash function H, i.e., the computation to evaluate H(k), may be split into two steps. In the first step, two primary hash functions F1 and F2 may be evaluated for the key k, resulting in two values F1(k) and F2(k) of p bits each. In the second step, a secondary hash function G may be evaluated for the values F1(k) and F2(k), such that H(k)=G(F1(k), F2(k)). Several such methods are found in the literature. To compute primary hash functions F1 and F2, one of these existing algorithms relies on the conditional summation of random integers modulo a chosen integer t. However, the computation of a modular sum of integers may be undesirable for implementation in hardware as it requires integer adders with carry chains and multiple conditional subtractions to compute a result in the range of 0 . . . t−1. The systems described herein may instead employ two primary hash functions that apply carry-free mathematical operations (e.g., polynomial arithmetic over a Galois field, such as GF(2)) to a key k to produce primary hash function values F1(k) and F2(k), which may then be combined to yield an index suitable for accessing one or more data values associated with the key k.

One embodiment of a method for evaluating a perfect hash function is illustrated by the flow diagram in FIG. 1. As illustrated at 110, in this example, the method may include a perfect hash function evaluation circuit receiving a key value as an input. In response, the method may include each of two primary hash function sub-circuits of the evaluation circuit applying a respective hash function that uses carry-free mathematical operations (e.g., polynomial arithmetic) to the key (as in 120) and each of the two primary hash function sub-circuits outputting a respective primary hash function value (as in 130).

As illustrated in FIG. 1, the method may include a secondary hash function sub-circuit of the evaluation circuit receiving the two primary hash function values as inputs (as in 140) and the secondary hash function sub-circuit applying a secondary hash function to the two primary hash function values (as in 150). As illustrated in this example, the method may include the secondary hash function circuit outputting a value usable to select a data table entry that is associated with the key value from among multiple table entries (as in 160).

In some embodiments of the systems described herein, the primary hash functions F1(k) and F2(k) may be defined through the multiplication of two respective bit matrices A1 and A2 of dimensions p×r with a key k that is represented as a bit vector k=($k_0$, . . . , $k_{r-1}$), followed by an addition of respective bit vectors $y_1$ and $y_2$. In some embodiments, the addition may be performed modulo 2. In one such embodiment, the mathematical formula for the computation of a function F, where F may be one of F1 or F2, may be represented by Equation 1, shown below:

$$F(k) = A * k + y \quad \text{Eqn. 1}$$

$$= \begin{pmatrix} a_{0,0} & \cdots & a_{0,r-1} \\ \vdots & \ddots & \vdots \\ a_{p-1,0} & \cdots & a_{p-1,r-1} \end{pmatrix} \begin{pmatrix} k_0 \\ \vdots \\ k_{r-1} \end{pmatrix} + \begin{pmatrix} y_0 \\ \vdots \\ y_{p-1} \end{pmatrix}$$

$$= \begin{pmatrix} a_{0,0}k_0 +_2 & a_{0,1}k_1 +_2 & \cdots & a_{0,r-1}k_{r-1} +_2 & y_0 \\ \vdots & \vdots & \ddots & \vdots & \vdots \\ a_{p-1,0}k_0 +_2 & a_{p-1,1}k_1 +_2 & \cdots & a_{p-1,r-1}k_{r-1} +_2 & y_{p-1} \end{pmatrix}$$

$$= \begin{pmatrix} f_0(k) \\ \vdots \\ f_{p-1}(k) \end{pmatrix}$$

In this example, the operator "$+_2$" represents modulo 2 addition, and the following are assumed:

$a_{i,j} \in \{0,1\}$ $k_i \in \{0,1\}$ $y_i \in \{0,1\}$ $f_i(k) \in \{0,1\}$

Figure 2:
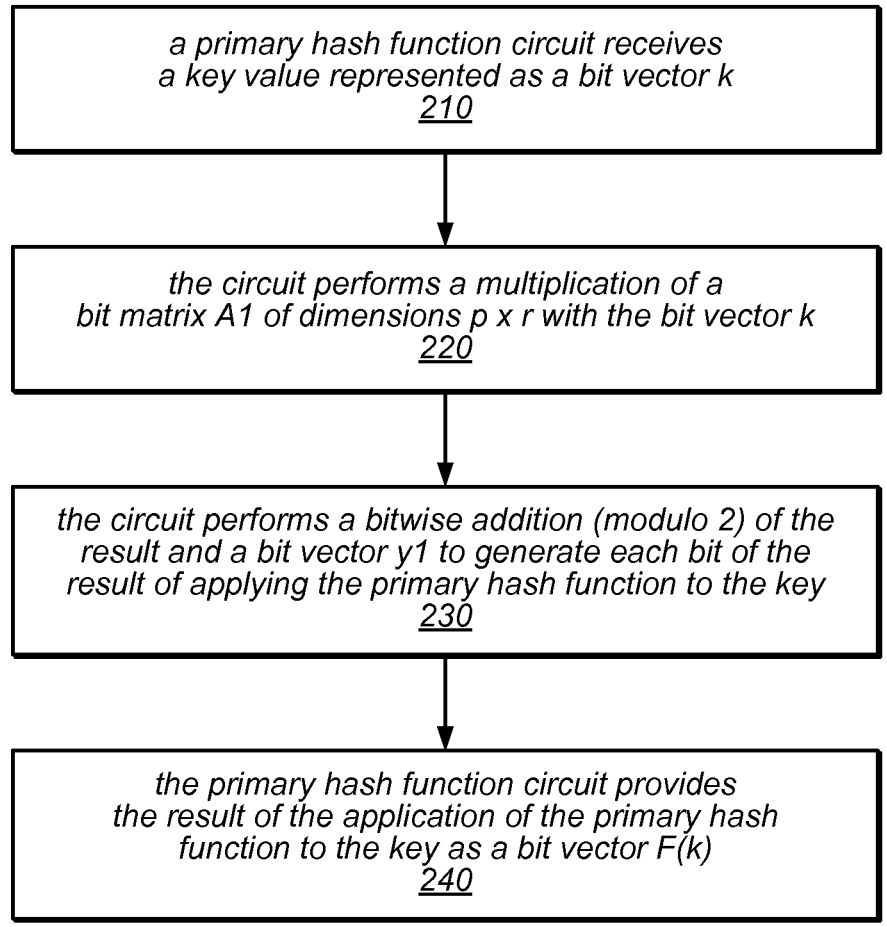
FIG. 2 is a flow diagram illustrating one embodiment of a method for evaluating a primary hash function.

One embodiment of a method for evaluating a primary hash function is illustrated by the flow diagram in FIG. 2. As illustrated in this example, the method may include a primary hash function circuit (which may be one of two or more primary hash function circuits, in different embodiments) receiving a key value represented as a bit vector k (as in 210). As described herein, the primary hash function circuit may be dynamically configured to support different numbers of keys and/or to support keys of different sizes (e.g., at different times) without modifying the hardware circuitry (e.g., by updating the representation of the hash function that will be computed by the circuitry in a memory or other re-programmable component). In response to receiving the key value, the method may include the circuit performing a multiplication of a bit matrix A1 of dimensions p×r with the bit vector k (as in 220). For example, the circuit may include multiple AND gates that are configured to perform the appropriate bit-wise multiplication operations.

As illustrated in this example, the method may include the circuit performing a bitwise addition (e.g., modulo 2) of the result and a bit vector y1 to generate each bit of the result of applying the primary hash function to the key (as in 230). For example, the circuit may include multiple XOR gates that are configured to combine the products of the bit-wise multiplication operations (e.g., to perform the appropriate bit-wise addition operations) to generate each element (bit) of the resulting matrix. The method may also include the primary hash function circuit providing the result of the application of the primary hash function to the key as a bit vector f(k), as in 240.

Figure 3:
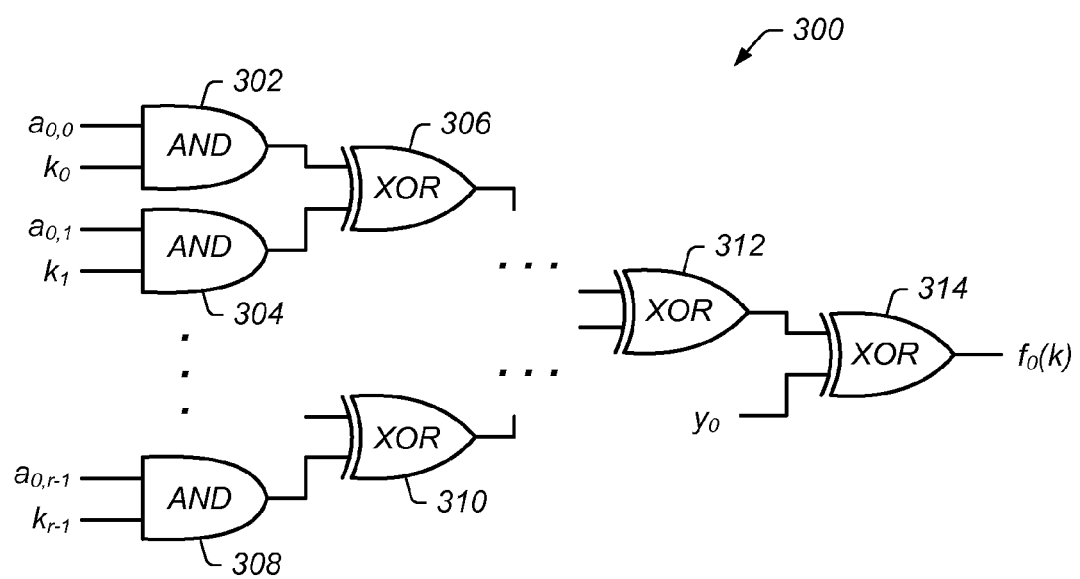
FIG. 3 is a block diagram illustrating a hardware circuit comprising AND gates and XOR gates that is configured to compute one bit of a primary hash function, according to one embodiment.

In some embodiments, the multiplication of two bits may be efficiently computed in hardware with an AND gate and the sum of two single-bit addends modulo 2 may be efficiently computed with an XOR gate. Hence, the sum of r single-bit addends modulo 2 may be computed with r−1 XOR gates. One such implementation is illustrated in FIG. 3, according to one embodiment. Specifically, FIG. 3 illustrates a hardware circuit 300 that includes multiple AND gates (including AND gates 302, 304, and 308) and a tree of XOR gates (including XOR gates 306, 310, 312, and 314) that are configured to compute one bit of F(k), as described above. In this example, the hardware circuit 300 is configured to compute bit $f_0(k)$ from the illustrated inputs (e.g., $a_{0,0}$ through $a_{0,r-1}$ and $k_0$ through $k_{r-1}$). To compute all p bits of function F, p parallel circuits similar to circuit 300 shown in FIG. 3 would be needed.

Figure 4:
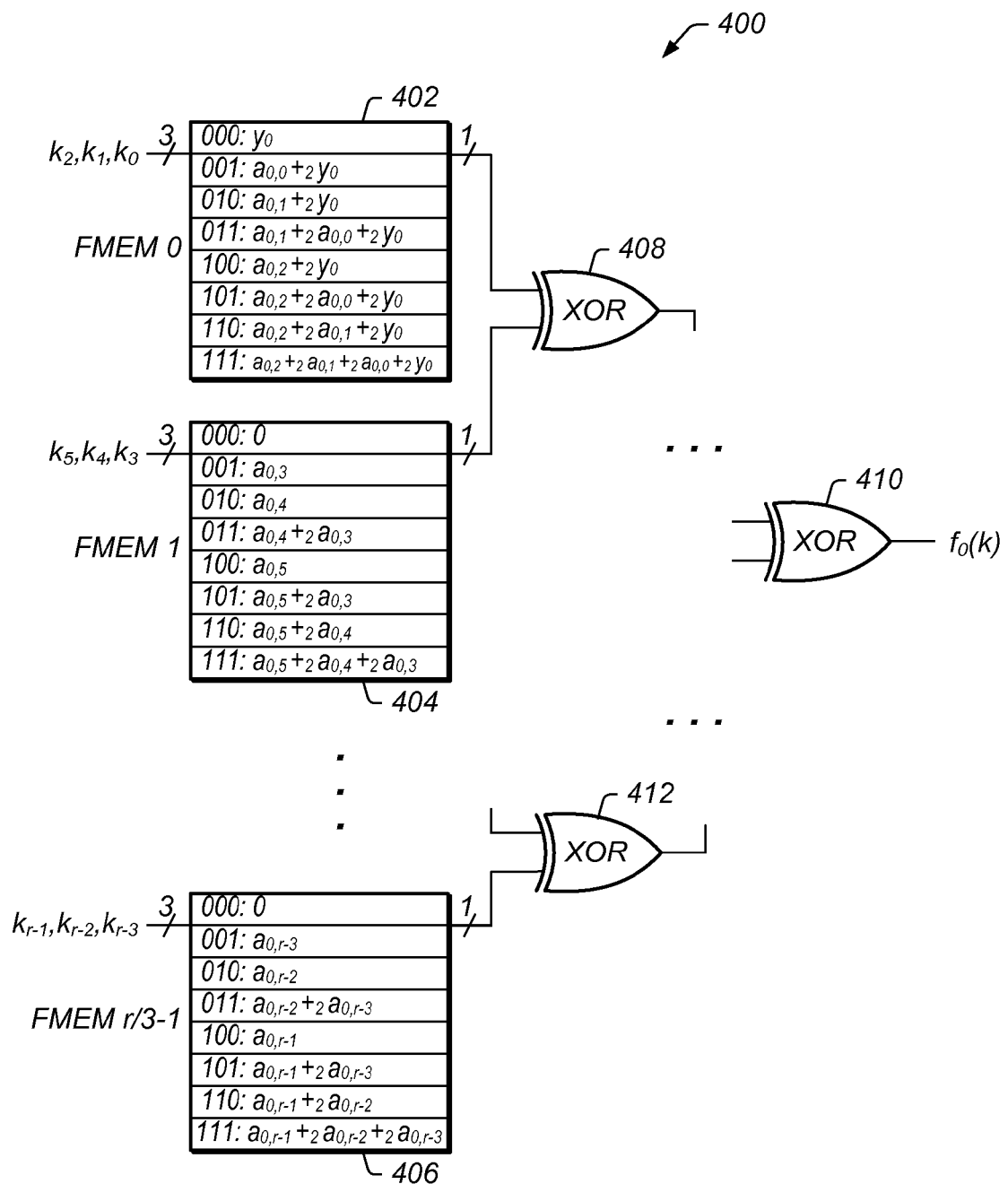
FIG. 4 is a block diagram illustrating a hardware circuit configured to compute one bit of a primary hash function in which a matrix and a vector for a primary hash function are stored in one or more random access memories, according to one embodiment.

In some embodiments, a representation of matrix A and vector y for a hash function F may be stored in one or more random access memories (each of which may be referred to herein as an "FMEM"). In some such embodiments, the sums of certain columns of matrix A may be pre-computed, and they may be subsequently selected by using the bits of key k as addresses into memories FMEM. FIG. 4 illustrates an example of such a circuit, according to one embodiment. Specifically, FIG. 4 illustrates a linear hash function circuit 400 that is configured to compute one bit of a hash function F. In this example, sums are pre-computed for groups of three columns, and groups of three bits of k are used as addresses into memories FMEM. For example, the fourth entry of FMEM 1 (404) represents the sum: $a_{0,4} +_2 a_{0,3}$. Note that the summation of a single bit of y may be included by storing the sum of the y bit and the pre-computed sums of the first columns of A in the first memory FMEM (illustrated in FIG. 4 as memory 402). For example, the fourth entry of FMEM 0 (402) represents the sum: $a_{0,1} +_2 a_{0,0} +_2 y_0$.

In this example, for keys k of r bits, ceil(r/3) memories FMEM are required (including memories 402, 404, and 406). In this example, each of the memories FMEM receives three consecutive bits of a key k, with FMEM 0 receiving the three lowest order bits of key k (e.g., $k_0$, $k_1$, and $k_2$), FMEM 1 receiving the next lowest order bits of key k (e.g., $k_3$, $k_4$, and $k_5$), and so on, with the final memory FMEM receiving the highest order bit of key k (e.g., $k_{r-3}$, $k_{r-2}$, and $k_{r-1}$). The three bits input to each memory FMEM are used to select a single bit table entry from that memory FMEM, such that the data output of each of the memories FMEM represents the pre-computed sum of three columns. For example, the fourth entry of FMEM 0 (402) may be selected when the three lowest order bits of key k are 011. In this example, the FMEM outputs are further summed using a tree of XOR gates (including XOR gates 408, 410, and 412) to compute one bit of F(k), in this case, $f_0(k)$.

In this example, FIG. 4 illustrates memories FMEM that have single-bit data outputs. However, data outputs of p bits and p trees of XOR gates would be needed to compute all p bits of function F. In other embodiments, groups of more or fewer than three columns may be pre-computed, with the memory requirements growing exponentially with the number of pre-computed columns. However, when groups of more than three columns are pre-computed, fewer FMEM memories are needed and fewer XOR gates are needed in the summation tree. In some embodiments, groups of four columns may be pre-computed.

In some embodiment, memories FMEM may store more than one function F. In some such embodiments, different functions F may be selected and evaluated by prepending a sequence of function selector bits s to the groups of key bits presented as inputs to each of the memories FMEM. For example, each FMEM may have two function selector bits $s_0$ and $s_1$ prepended to the addresses generated by key bits k.

This may allow memories FMEM to store four different functions F0, F1, F2, and F3, which can be selected using different combinations of values for $s_0$ and $s_1$.

Figure 5:
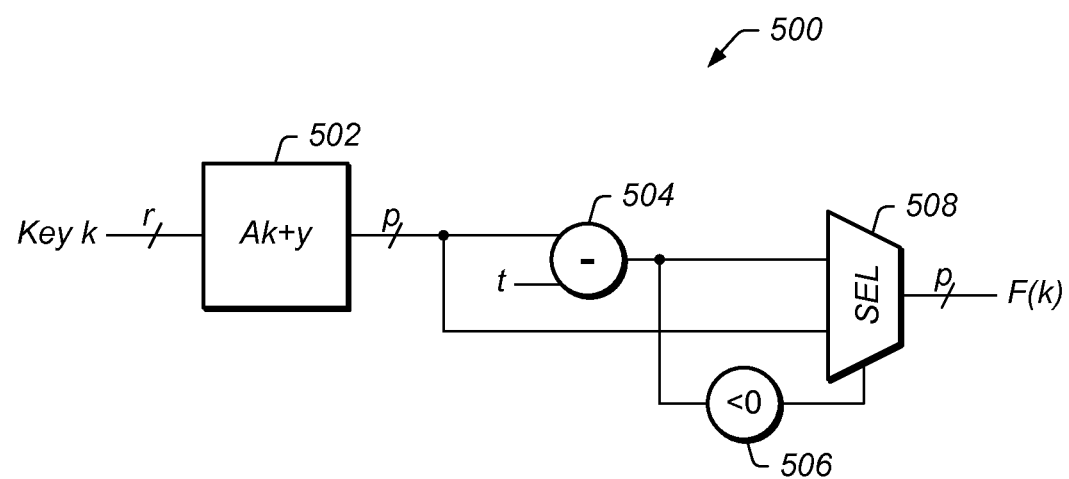
FIG. 5 is a block diagram illustrating a linear hash function circuit that is configured to compute a primary hash function and that imposes a limit on the output values, according to one embodiment.

While functions F can be computed fast with a binary matrix/vector multiplication and addition $F(k)=Ak+_2 y$, it may be desirable in some cases to limit the values of F not only to bit vectors of up to p bits, but to p-bit unsigned integers in the range between 0 and up to (but not including) a chosen integer t, with $2^{p-1} < t \leq 2^p$, such that $F(k)=Ak+_2 y \mod t$. FIG. 5 illustrates a linear hash function circuit that is configured to compute a primary hash function that imposes such a limit, according to one embodiment. In this example, circuit 500 that includes a subtractor (504), a comparator 506), and a multiplexer (508) that collectively compute $F(k)=Ak+_2 y \mod t$. More specifically, circuit 500 computes both $Ak+_2 y$ (in sub-circuit 502) and also $(Ak+_2 y)-t$ (where "$+_2$" denotes bit-wise addition modulo 2 and "−" denotes subtraction of p-bit integers), and selects whichever one of the two terms is in the range between 0 and t−1.

As previously noted, in some embodiments, a secondary hash function circuit (or a secondary hash function sub-circuit of a hash function evaluation circuit) may be configured to receive the outputs of two primary hash function circuits (or sub-circuits), and to select values associated with the outputs of the two primary hash function circuits (or sub-circuits). The secondary hash function circuit (or sub-circuit) may be configured to apply one or more logical and/or mathematical operations to the associated values (e.g., ADD, XOR, etc., in different embodiments) to generate its output. As described herein, the output of the secondary hash function circuit (which may represent the application of a perfect hash function to the input key) may in some embodiments be used to select a data value (or one of multiple data values) associated with the input key. In some embodiments, the secondary hash function circuit may also be configured to validate the input key (e.g., to verify that the selected data value is, indeed, associated with the input key).

Figure 6:
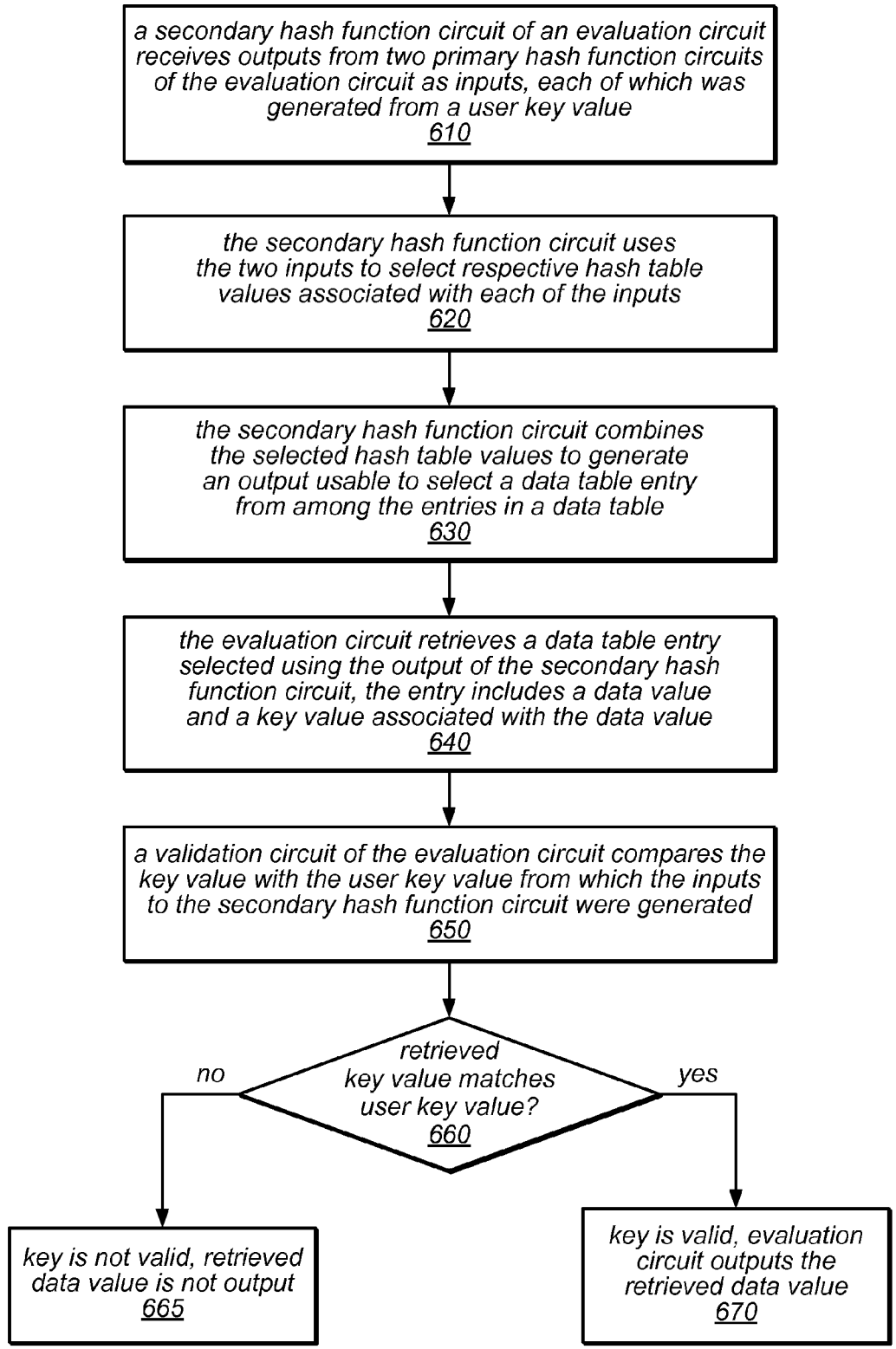
FIG. 6 is a flow diagram illustrating one embodiment of a method for evaluating a secondary hash function.

One embodiment of a method for evaluating a secondary hash function is illustrated by the flow diagram in FIG. 6. As illustrated in this example, the method may include a secondary hash function circuit of an evaluation circuit receiving outputs from two primary hash function circuits of the evaluation circuit as inputs, each of which was generated from a user key value (as in 610). For example, in some embodiments, the inputs to the secondary hash function may be computed using the methods and/or circuitry illustrated in any of FIGS. 2-5 and described above. In other embodiments, the inputs to the secondary hash function may be computed using other methods and/or circuitry. As illustrated in this example, the method may include the secondary hash function circuit using the two inputs to select respective hash table values associated with each of the inputs (as in 620). For example, the two inputs may be used to select respective hash values from a dual port memory, from two logically distinct portions of a single physical memory, or from two physically distinct memories, in different embodiments.

As illustrated in FIG. 6, the method may include the secondary hash function circuit combining the selected hash table values to generate an output usable to select a data table entry from among the entries in a data table (as in 630). For example, in different embodiments, the secondary hash function circuit may be configured to aggregate the selected hash table values using one or more logical and/or mathematical operations. The method may also include the evaluation circuit retrieving a data table entry selected using the output of the secondary hash function circuit, and the entry may include a data value and a key value associated with the data value (as in 640).

In some embodiments (e.g., in embodiments in which key validation is supported and enabled) the method may include a validation circuit of the evaluation circuit comparing the key value retrieved from the selected data table entry with the user key value from which the inputs to the secondary hash function circuit were generated (as in 650). If the retrieved key value does not match the user key value (shown as the negative exit from 660), the key may not be valid, and the retrieved data value may not be output (shown as 665). In some embodiments, the method may include outputting an indication that the key was not valid (not shown). However, if the retrieved key value does match the user key value (shown as the positive exit from 660), the method may include the evaluation circuit outputting the retrieved data value (as in 670). In some embodiments, the method may include outputting an indication that the key was valid (not shown). In some embodiments, the method may also include determining whether the user key value and/or the retrieved key value are within a valid key value range (not shown).

Figure 7:
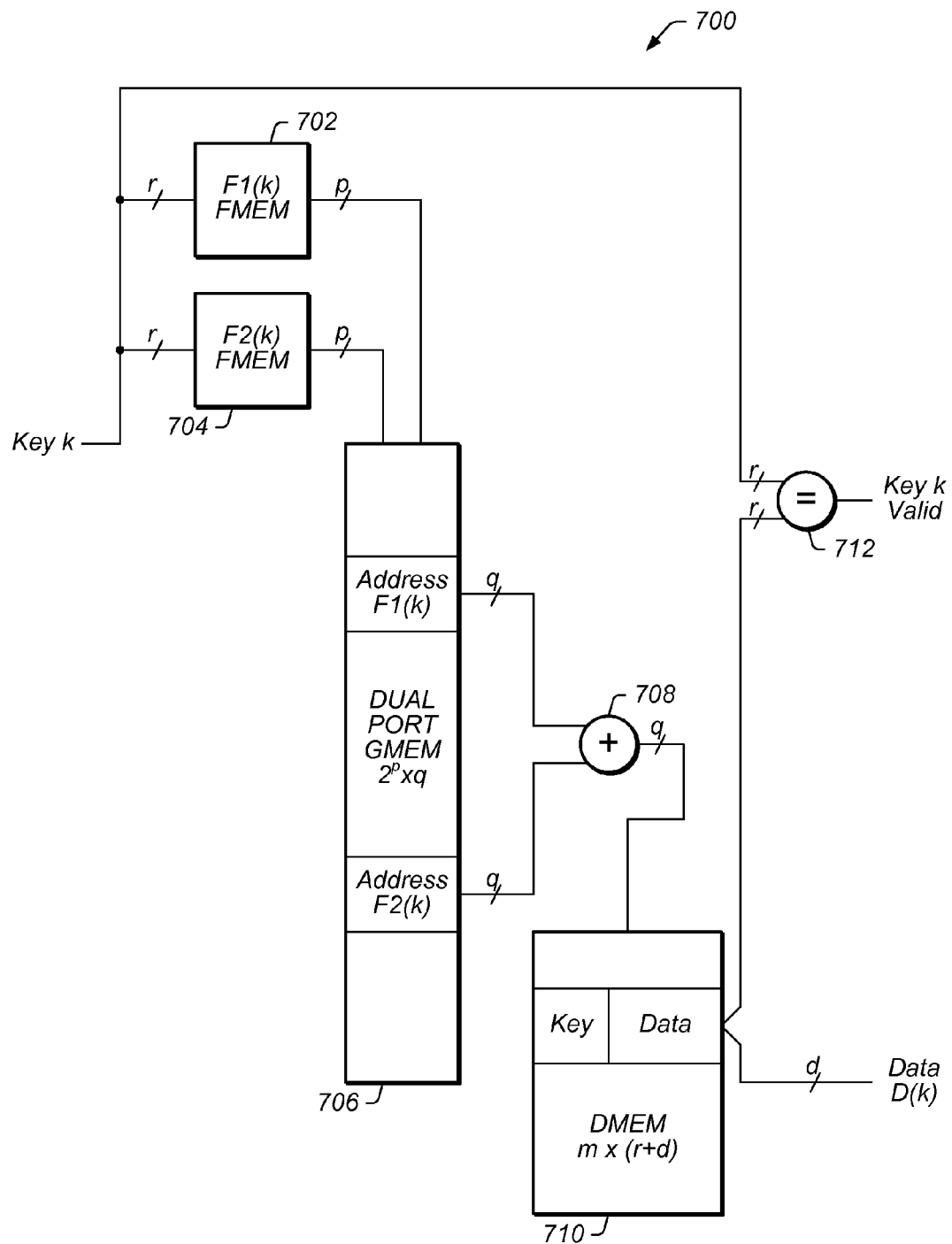
FIG. 7 is a block diagram illustrating a circuit configured to apply a perfect hash function to a key value, retrieve data associated with the key value, and verify the validity of the key value, according to one embodiment.

One embodiment of a circuit configured to apply a perfect hash function to a key value, retrieve data associated with the key value, and verify the validity of the key value is illustrated in FIG. 7. More specifically, FIG. 7 illustrates a circuit 700 that is configured to compute $H(k)=G(F1(k), F2(k))$ for a given value of a key k, to retrieve data associated with the given value of key k and output it as data D(k), and to output an indication of whether the given value of key k is valid (e.g., whether there exists a mapping between the given value of key k and the data output by circuit 700 as D(k)). In this example, circuit 700 is configured to compute two p-bit primary hash values F1(k) and F2(k), which may each be computed with a sub-circuit such as the one shown in FIG. 4. These sub-circuits are illustrated in FIG. 7 as FMEMs 702 and 704. In this example, circuit 700 (or more specifically, the sub-circuit GMEM 706, which may include a random access memory) is configured to combine F1(k) and F2(k) and to compute the secondary hash value $H(k)=G(F1(k), F2(k))$. In some embodiments, computing G(F1(k), F2(k)) may include utilizing F1(k) and F2(k) as two p-bit addresses into a random access memory (e.g., GMEM 706) to retrieve two q-bit values. In embodiments in which functions F1 and F2 are computed through a binary matrix/vector multiplication and addition $F(k)=Ak+_2 y$, as described above, memory GMEM 706 may need to accommodate at least $2^p$ entries, where each memory location holds a q-bit value. In embodiments in which F1 and F2 are computed as $F(k)=Ak+_2 y \mod t$, memory GMEM 706 may need to accommodate at least t entries.

As illustrated in FIG. 7, memory GMEM 706 may be a dual-ported memory, which may allow for concurrent retrieval of both q-bit values. The two q-bit values may be combined in an addition circuit 708 using, for example, one of the following summation methods: unsigned integer addition, unsigned modular addition, signed integer addition, or a bit-wise XOR operation. For example, in an embodiment in which addition circuit 708 is an unsigned integer adder, circuit 708 may be configured to compute the q-bit sum of the two values found at addresses F1(k) and F2(k) modulo $2^q$, i.e., $G(F1(k), F2(k))=GMEM(F1(k))+GMEM(F2(k)) \mod 2^q$.

In another embodiment, the addition circuit 708 may be an unsigned modular integer adder that is configured to compute the q-bit sum of the two values found at addresses F1(k) and F2(k) modulo a chosen integer m, i.e., $G(F1(k), F2(k))=GMEM(F1(k))+GMEM(F2(k)) \mod m$. Assuming that m is in the range $2^{q-1}<m\leq 2^q$, the modular integer adder may only have to perform one conditional subtraction and can be implemented with circuitry similar to the circuitry illustrated in FIG. 5. In such an embodiment, one possible choice for m may be the number of keys in the hash table.

In another embodiment, the addition circuit 708 may be a signed integer adder that is configured to compute the sum of the two values found at addresses F1(k) and F2(k) interpreted as signed integers, i.e., G(F1(k), F2(k))=GMEM(F1(k))+ GMEM(F2(k)). In yet another embodiment, the addition circuit 708 may include a set of XOR gates that are collectively configured to compute the q-bit bit-wise XOR of the two values found at addresses F1(k) and F2(k), i.e., G(F1(k), F2(k))=GMEM(F1(k)) XOR GMEM(F2(k)). In such an embodiment, the value of q may be chosen in accordance with the number of keys in and/or one of the aforementioned summation methods. For example, q may be chosen such that for a given summation method, any index i=H(k) in the range 0 to m−1 can be expressed as the sum of two q-bit values.

In the example illustrated in FIG. 7, to retrieve data D(k) associated with a given value of key k, index i=H(k) may be used as an address into a random access data memory DMEM 710. In some embodiments, DMEM may need to accommodate at least m entries, and each memory location may hold at least a d-bit value. For example, the d-bit value D(k)=DMEM (H(k)) may represent the data associated with a given value of key k. In some embodiments, d may be chosen in accordance with the maximum size of the data that is associated with any valid value of key k (e.g., any value of key k for which an entry is included in DMEM 710).

While H(k) can be computed for arbitrary bit vectors k, some applications may require verification that the value of k indeed represents a valid key. In some embodiments, in order to provide such verification, circuit 700 may store the respective value of the key that is associated with the data at each memory location in DMEM such that the memory location associated with each address holds both a d-bit data value and an r-bit key value. As illustrated in this example, in some embodiments a bit-wise comparator circuit 712 may be used to compare the key value found at memory location DMEM (H(k)) with the key k used to compute H(k). In such embodiments, comparator circuit 712 may indicate the validity of key k (or the lack thereof) with a binary output signal.

Figure 8:
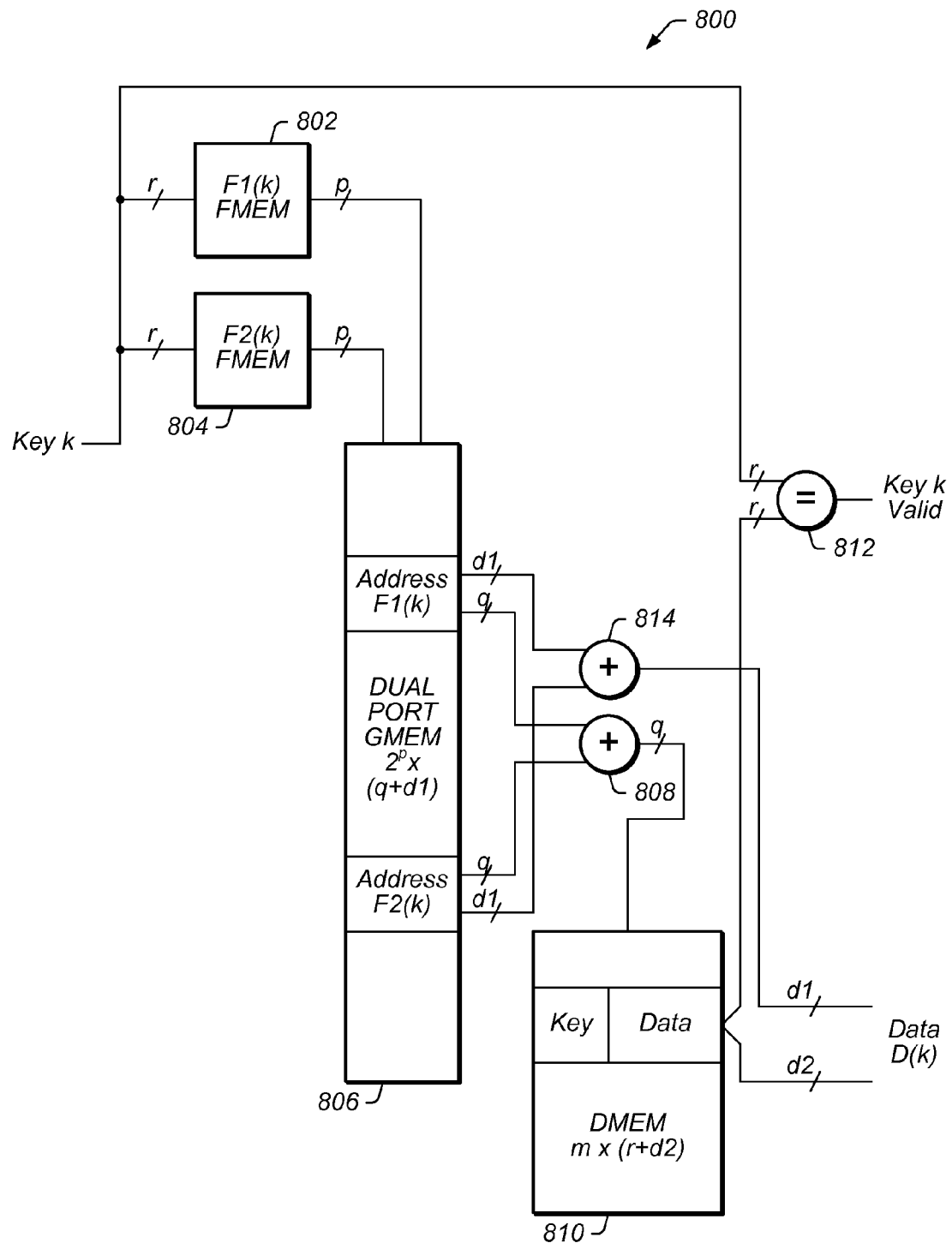
FIG. 8 is a block diagram illustrating a circuit configured to apply a perfect hash function to a key value, retrieve data associated with the key value, and verify the validity of the key value, in which at least a portion of the retrieved data is made available prior to verifying the validity of the key value, according to one embodiment.

In some embodiments, a hash function evaluation circuit similar to circuit 700 in FIG. 7 may be configured to store all or a portion of the d-bit data D(k) associated with a given value of key k in an encoded format in memory GMEM, thereby allowing faster access to the data. One embodiment of a circuit configured to apply a perfect hash function to a key value, retrieve data associated with the key value, and to make at least a portion of the retrieved data available prior to verifying the validity of the key value is illustrated in FIG. 8. As in the previous example, FIG. 8 illustrates a circuit 800 that is configured to compute H(k)=G(F1(k), F2(k)) for a given value of a key k, to retrieve data associated with the given value of key k and output it as data D(k), and to output an indication of whether the given value of key k is valid (e.g., whether there exists a mapping between the given value of key k and the data output by circuit 800 as D(k)). As in the previous example, circuit 800 may be configured to compute two p-bit primary hash values F1(k) and F2(k), which may each be computed with a sub-circuit such as the one shown in FIG. 4. These sub-circuits are illustrated in FIG. 8 as FMEMs 802 and 804.

As in the previous example, circuit 800 (or more specifically, the sub-circuit GMEM 806, which may include a random access memory) may be configured to combine F1(k) and F2(k) and to compute a secondary hash value for the given value of key k, which may be usable to select a corresponding entry in DMEM 810. However, unlike in the example illustrated in FIG. 7, in this example, D(k) may be divided into two portions of d1 bits D1(k) and d2 bits D2(k) with d=d1+d2. For example, D1(k) may be stored in an encoded format in GMEM 806 at two memory locations GMEM(F1(k)) and GMEM(F2(k) and D2(k) may be stored in an unencoded format in DMEM 810.

As illustrated in FIG. 8, memory GMEM 806 may be a dual-ported memory, which may allow for concurrent retrieval of both entries that correspond to the given value of key k. In some embodiments, computing a secondary hash value that is usable to select an entry in DMEM 810 may include utilizing F1(k) and F2(k) as two p-bit addresses into a random access memory (e.g., GMEM 806) to retrieve q-bit values from the two entries. In embodiments in which functions F1 and F2 are computed through a binary matrix/vector multiplication and addition F(k)=Ak+$_2$ y, as described above, memory GMEM 806 may need to accommodate at least $2^p$ entries, where each memory location holds a (q+d1)-bit value. In embodiments in which F1 and F2 are computed as F(k)=Ak+$_2$ y mod t, memory GMEM 806 may need to accommodate at least t entries.

As in the example illustrated in FIG. 7 and described above, the two q-bit values may be combined in an addition circuit 808 using, for example, one of the following summation methods: unsigned integer addition, unsigned modular addition, signed integer addition, or a bit-wise XOR operation. For example, in an embodiment in which addition circuit 808 is an unsigned integer adder, circuit 808 may be configured to compute the q-bit sum of the two q-bit values retrieved from the entries at addresses F1(k) and F2(k) modulo $2^q$, i.e., G(F1(k), F2(k))=GMEM(F1(k))+GMEM(F2(k)) mod $2^q$. In another embodiment, the addition circuit 808 may be an unsigned modular integer adder that is configured to compute the q-bit sum of the two q-bit values retrieved from the entries at addresses F1(k) and F2(k) modulo a chosen integer in, i.e., G(F1(k), F2(k))=GMEM(F1(k))+GMEM(F2(k)) mod m. Assuming that in is in the range $2^{q-1}<m\leq 2^q$, the modular integer adder may only have to perform one conditional subtraction and can be implemented with circuitry similar to the circuitry illustrated in FIG. 5. In such an embodiment, one possible choice for in may be the number of keys in the hash table.

In another embodiment, the addition circuit 808 may be a signed integer adder that is configured to compute the sum of the two q-bit values retrieved from the entries at addresses F1(k) and F2(k) interpreted as signed integers, i.e., G(F1(k), F2(k))=GMEM(F(k))+GMEM(F2(k)). In yet another embodiment, the addition circuit 808 may include a set of XOR gates that are collectively configured to compute the q-bit bit-wise XOR of the two values found at addresses F1(k) and F2(k), i.e., G(F1(k), F2(k))=GMEM(F1(k)) XOR GMEM(F2(k)). In such an embodiment, the value of q may be chosen in accordance with the number of keys in and/or one of the aforementioned summation methods. For example, q may be chosen such that for a given summation method, any index i=H(k) in the range 0 to m−1 can be expressed as the sum of two q-bit values.

In the example illustrated in FIG. 8, to retrieve data D2(k) associated with a given value of key k, index i=H(k) may be used as an address into a random access data memory DMEM 810. In some embodiments, DMEM may need to accommodate at least in entries, and each memory location may hold at least a d2-bit value. For example, the d2-bit value D2(k)= DMEM(H(k)) may represent the D2(k) portion of the data associated with a given value of key k. In various embodiments, d (which may be equal to d1+d2) may be chosen in accordance with the maximum size of the data D(k) that is associated with any valid value of key k (e.g., any value of key k for which an entry is included in DMEM 810) or in accordance with the maximum size of the D2(k) portion of D(k).

In some embodiments, in order to provide verification that the value of k represents a valid key, circuit 800 may store the respective value of the key that is associated with the data at each memory location in DMEM 810 such that the memory location associated with each address holds both a d2-bit data value and an r-bit key value. As illustrated in this example, in some embodiments a bit-wise comparator circuit 812 may be used to compare the key value found at memory location DMEM(H(k)) with the key k used to compute H(k). In such embodiments, comparator circuit 812 may indicate the validity of key k (or the lack thereof) with a binary output signal.

As illustrated in FIG. 8, in embodiments in which D(k) may be divided into two portions of d1 bits D1(k) and d2 bits D2(k), a data decoding function E for D1(k) may be chosen that is similar or identical to G(F1(k), F2(k)) of H(k) such that D1(k)=E(F1(k), F2(k)). For example, data decoding function E (shown as 814 in FIG. 8) may be configured to perform unsigned modular integer addition, signed integer addition, or a bit-wise XOR of two d1-bit entries found at the two GMEM locations GMEM(F1(k)) and GMEM(F2(k)) to generate the D1(k) portion of D(k). While not shown in FIG. 8, in some embodiments, memory GMEM 806 may store the r-bit key values associated with the data in each entry in an encoded format, and these key values may be decoded and provided to the bit-wise comparator circuit 812 to determine the validity of the given value of key k that was presented to circuit 800.

Some applications in which table lookups are performed (e.g., some computer networking applications) require key lookups from multiple hash tables. Some embodiments of the systems described herein may support multiple tables (and corresponding hash functions) with a single hardware circuit, and these tables/functions may be selectable at runtime according to the value of a hash function selection input signal. For some applications, the size and number of tables may not be known at circuit design time. More specifically, for individual tables, the number of keys and the number of data words associated with each key may not be known at circuit design time. Some embodiments of the systems described herein may provide hardware circuitry that can support a variable number of hash functions and/or hash tables (e.g., circuitry that supports multiple hash functions represented within the same or different tables within the same memory or different memories), hash tables that have a variable (and/or configurable) numbers of keys (e.g., tables having a variable/configurable number of entries, each corresponding to a respective key), and/or tables that have a variable (and/or configurable) number of data words associated with each key. In some embodiments, the systems described herein may allow users to optimize the utilization of available memory resources for their application (e.g., to dynamically configure those memory resources to hold multiple tables of variable sizes, with variable key and/or data sizes). For example, in some embodiments, the system in which the circuits and techniques described herein are employed may be a user-programmable device. In such embodiments, the circuits (or hash tables thereof) described herein may be generated based on a user-provided program and/or user-provided table data, and may be dynamically configured to optimize the utilization of available memory resources for their application according to the values specified for one or more configuration parameters. In addition, for circuits (or hash tables thereof) that support multiple data values per key value and/or that support dynamic re-loading of various memories of the circuits, data selection during hash function evaluation and/or the loading of hash tables in various memories may be performed and/or controlled according to the values of one or more user-specified data selection parameters.

Figure 9:
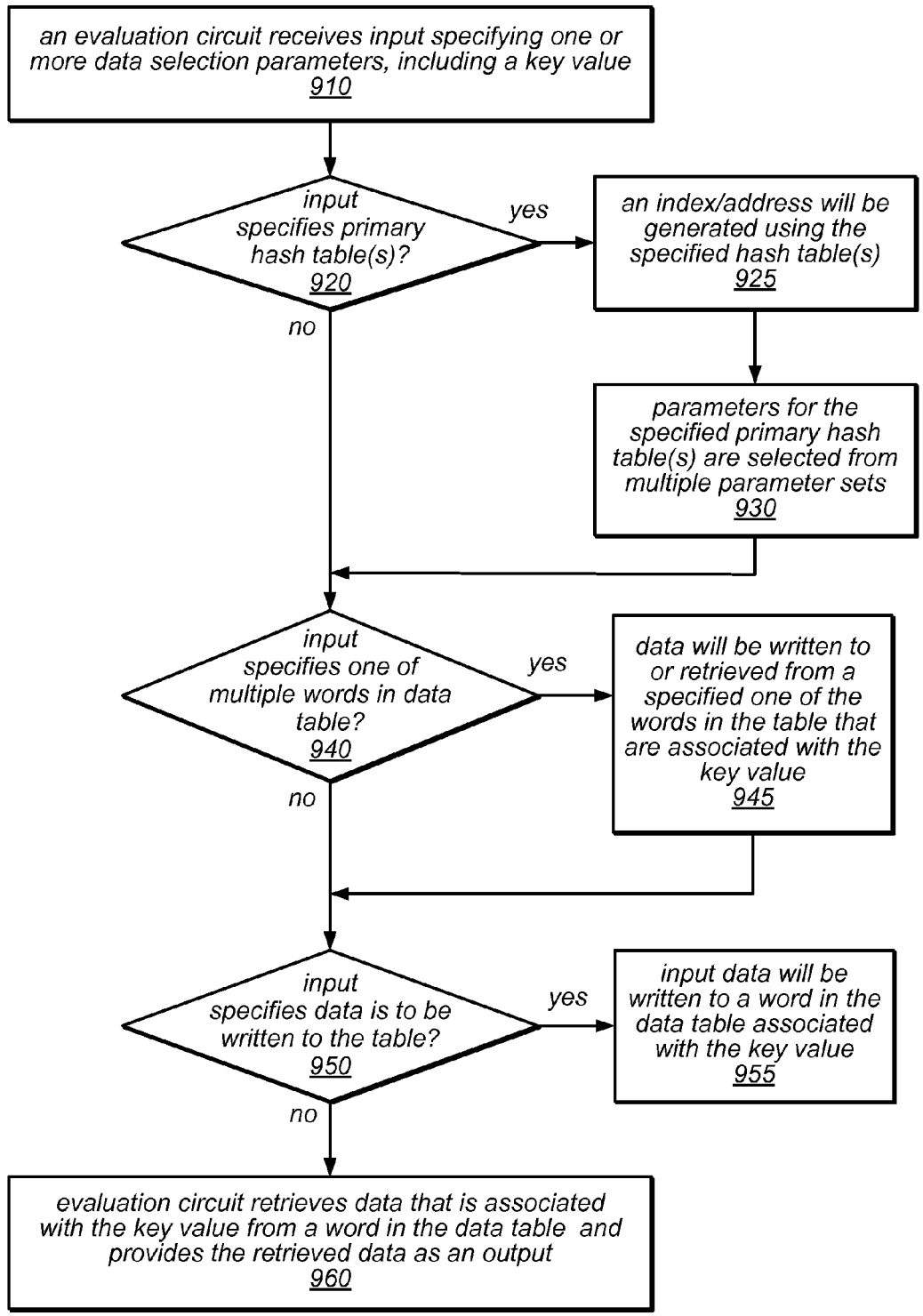
FIG. 9 is a flow diagram illustrating one embodiment of a method for evaluating a hash function according to specified input parameters.

One embodiment of a method for evaluating a hash function according to specified input parameters is illustrated by the flow diagram in FIG. 9. As illustrated in this example, the method may include an evaluation circuit receiving input specifying one or more data selection parameters, including a key value (as in 910). In some embodiments, if the input specifies the use of one or more particular primary hash tables from among multiple supported primary hash tables (e.g., primary hash tables that implement a selected pair of primary hash functions), an index/address may be generated using the specified hash table(s), and parameters for the specified primary hash table(s) may be selected from multiple parameter sets (e.g., using the same input to index/address a set of hash function parameters in a parameter table). This is illustrated in FIG. 9 by the positive exit from 920 and elements 925 and 930. If the input does not specify any particular primary hash tables (e.g., the circuit includes only one primary hash table, or only one pair of primary hash tables), the operations illustrated as 925 and 930 may not be performed.

As illustrated in FIG. 9, if the input specifies one of multiple words in the data table (e.g., one of multiple words in the table that match the key value), data will be written to or retrieved from a specified one of the words in the data table that are associated with the key value, as selected by the input. This is shown as the positive exit from 940 and element 945. If the input does not specify a particular word in the data table (e.g., if there is only one word in the data table that is associated with the key value, or if a particular one of multiple words in the data table that are associated with the key value is configured to be selected by default in the absence of a selection), no such selection will be made. As illustrated in this example, if the input specifies that data is to be written to the table (e.g., if the inputs include data to be written to the appropriate data table and a write enable signal that is "true"), the method include writing the input data to a word in the data table associated with the key value. This is shown as the positive exit from 950 and element 955. If the input does not specify that data is to be written to the table (e.g., if the inputs do not include data to be written and/or do not include a write enable signal that is "true"), the evaluation circuit may be configured to perform a read type operation. This is shown as the negative exit from 950. In this case, the method may include the evaluation circuit retrieving data that is associated with the key value from a word in the data table, and the evaluation circuit providing the retrieved data as an output, as in 960.

Figure 10:
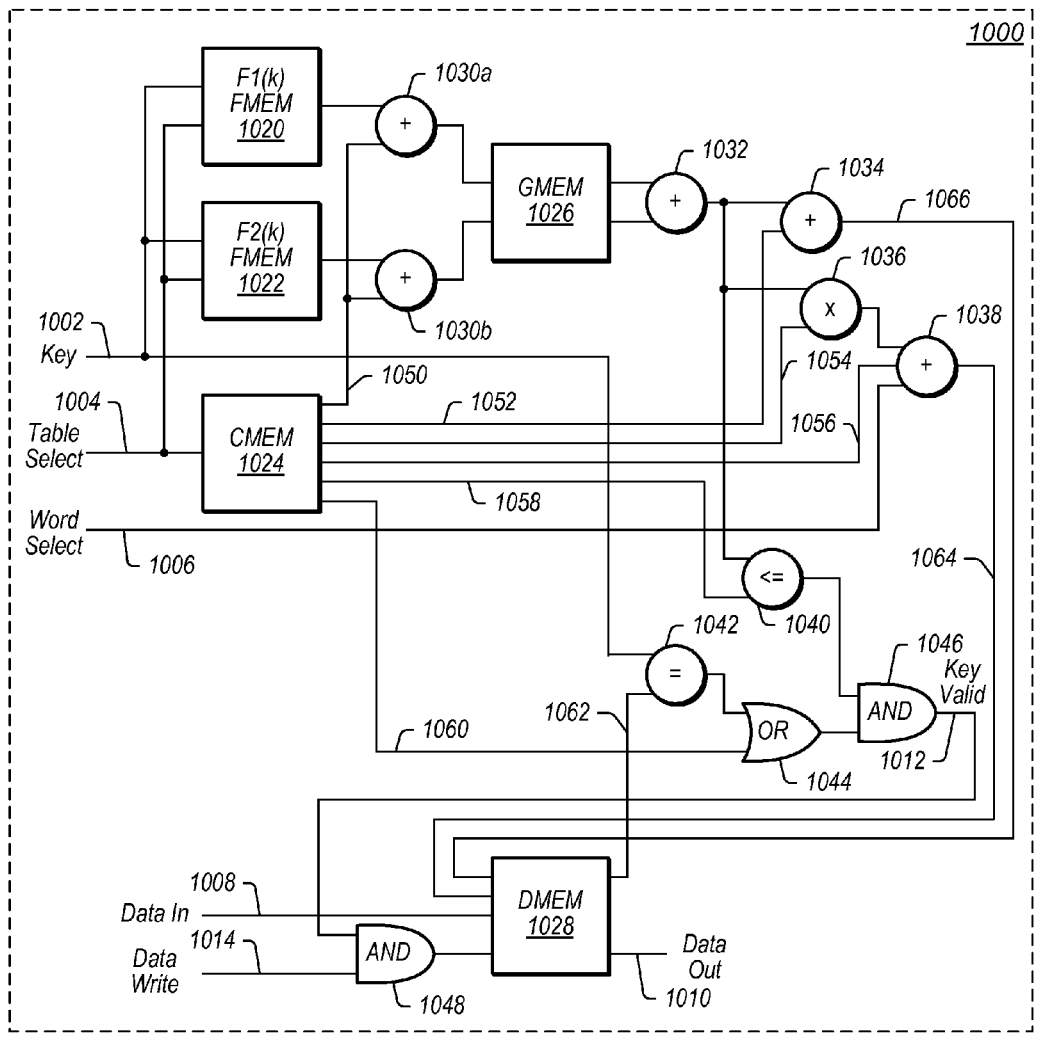
FIG. 10 is a block diagram illustrating a hash table circuit that is configured to store and selectively execute lookup functions in multiple lookup tables of variable sizes, according to one embodiment.

One embodiment of a hash table circuit that is configured to store and selectively execute lookup functions in multiple lookup tables of variable sizes is illustrated by the block diagram in FIG. 10. More specifically, FIG. 10 illustrates a hash table circuit 1000 that is configured to store various hash functions and to selectively execute lookup operations in one of multiple lookup tables of variable sizes within a set of memories FMEM 1020/1022, CMEM 1024, GMEM 1026, and DMEM 1028 of fixed sizes. In this example, hash table circuit 1000 has five input signals: a key input 1002, a table select indicator 1004, a data word selector input 1006, a data word input 1008, each of which may be multiple bits wide, and a single-bit data write enable signal 1014. In this example, hash table circuit 1000 has two outputs: a data word output 1010 (which may be multiple bits wide), and a single-bit key valid output 1012. As described in more detail below, hash functions, parameter values, data values, and keys for multiple hash tables may be stored in primary hash functions memories FMEM within linear hash function circuits 1020 and 1022, secondary hash function memory GMEM 1026, context memory CMEM 1024, and data memory DMEM 1028. In this example, key lookups in a specific hash table may be performed in response to a key k being presented on key input 1002 and a table number being presented on table select indicator input 1004.

In the illustrated embodiment, hash tables have data associated with each key that spans multiple words in data memory DMEM 1028, and the value presented on data word selector input 1006 specifies which one of the multiple words to look up and output on data word output 1010. Each hash table has its own linear hash functions F1(k) and F2(k), which are selected from a set of hash functions stored in memories FMEM in linear hash function circuits 1020 and 1022 using table select indicator 1004. In other words, table select indicator 1004 provides a hash function selection value. In this example, table select indicator 1004 is also used as an address into context memory CMEM 1024. CMEM 1024 includes one memory location for each hash table, and that memory location stores a set of parameter values for the hash table. The parameter values for a single selected hash table are output onto signals 1050, 1052, 1054, 1056, and 1058, dependent on the value of table select indicator 1004. In this example, the outputs of CMEM 1024 include a GMEM address offset 1050 into GMEM 1026, a key address offset 1052 into DMEM 1028, a key index multiplicand 1054, a hash table data address offset 1056 into data memory DMEM 1028, a maximal index 1058, and a key validation indicator 1060. In other embodiments, more, fewer, or different parameter values may be stored in CMEM 1024 and output to other components of hash table circuit 1000 dependent on the value of table select indicator 1004.

In the illustrated embodiment, in response to a key k being presented on key input 1002, linear hash function circuits 1020 and 1022 are configured to output hash values F1(k) and F2(k), respectively. The output hash values F1(k) and F2(k) are then individually added to GMEM address offset 1050 using unsigned integer adders 1030a and 1030b to select two addresses in secondary hash function memory GMEM 1026. In this example, address offset 1050 is used to indicate the starting address of one of multiple secondary hash functions stored in various memory regions of GMEM 1026. As previously noted, GMEM 1026 may be a dual-ported memory, which may allow for concurrent accesses for two input addresses. In this example, GMEM 1026 is configured to output two data values, which are combined in addition circuit 1032. As in previous examples, addition circuit 1032 may be configured to perform unsigned integer addition, signed integer addition, modular integer addition, or XOR addition, in different embodiments. In this example, addition circuit 1032 is configured to output secondary hash value H(k)=G (F1(k), F2(k)).

In the illustrated embodiment, based on H(k), hash table circuit 1000 is configured to compute two addresses into data memory DMEM 1028: one to retrieve and compare a copy of the key to a value stored in DMEM 1028, and one to access data associated with the key. The address used to retrieve a copy of the key (shown as 1066) is computed and output by integer adder 1034, which adds H(k) to key address offset 1052. In this example, the use of the key address offset parameter may allow the set of keys to be stored in arbitrary memory regions in DMEM 1028. In particular, the set of keys for different hash tables may be stored in different memory regions within DMEM 1028. In this example, the address used to access the data associated with the key (shown as 1064) is computed by integer multiplier 1036 and integer adder 1038. More specifically, integer multiplier 1036 is configured to compute the product of index H(k) and key index multiplicand 1054. Note that key index multiplicand 1054 indicates the number of data words stored with (or in association with) each key in a particular hash table. For example, if each key in a particular hash table has four data words associated with it, key index multiplicand 1054 would be set to four.

In the example hash table circuit 1000 illustrated in FIG. 10, the product of H(k) and key index multiplicand 1054 is added to hash table data address offset 1056 and data word selector input 1006 by integer adder 1038. In this example, the use of the data address offset parameter may allow data sets of different hash tables to be stored in different memory regions within DMEM 1028. In addition, the inclusion of the word selector input in the data selection operation may allow one of multiple words stored in association with a particular key to be accessed. For example, if, in a particular hash table, four words are stored in association with each key and the first word is to be accessed, data word selector input 1006 would be set to zero. If the fourth word is to be accessed, data word selector input 1006 would be set to three.

In the illustrated embodiment, DMEM 1028 is configured to output a selected data word (at 1010) and a key value that is stored in DMEM in association with the selected data word (at 1062). In this example, comparator 1042 is configured to compare the key value 1062 output by DMEM 1028 to key input 1002. If the values are equal, comparator 1042 is configured to output a logical value of 1 (true), otherwise, comparator 1042 is configured to output a logical value of 0 (false). In this example, OR-gate 1044 is configured to combine the output of comparator 1042 and key validation indicator 1060, and to output a logical value of 1 (true) if either input is set to a value of 1 (true). If key validation indicator 1060 is set to 0, OR-gate 1044 will output the same value as comparator 1042. If key validation indicator 1060 is set to 1, OR-gate 1044 will output a logical value of 1 (true). In this case, the input key may be considered valid independent of the comparison. As illustrated in this example, in some embodiments individual hash tables may be configured to either consider any input key valid or to verify a given input key against a set of keys stored in a memory region of DMEM 1028 (where each address in that memory region holds one key).

Note that, in some embodiments, invalid input keys may lead to invalid indices H(k) being output by addition circuit 1032 and may, in turn, lead to the generation of key and data addresses into incorrect memory regions in DMEM 1028. In the example illustrated in FIG. 10, to validate the index range for a particular input key, comparator 1040 is configured to compare the key index H(k) output by addition circuit 1032 to maximal index 1058. In this example, comparator 1040 is configured to output a logical value of 1 (true) if H(k) is less than or equal to maximal index 1058, or to output a logical value of 0 otherwise. In other words, in this and other embodiments, individual hash tables may be configured with a valid index range from 0 to the maximal index, and input keys that result in an index greater than the maximal index may be detected.

In some embodiments of the hash table circuit 1000 illustrated in FIG. 10, e.g., in embodiments in which addition circuit 1032 performs signed integer addition, comparator 1040 may be configured compare the output of addition circuit 1032 to 0 and to output a logical value of 0 (false) if the output of addition circuit 1032 is less than 0. As illustrated in FIG. 10, the outputs of OR-gate 1044 and comparator 1040 are combined in AND-gate 1046 to compute key valid output 1012. In this example, key valid output 1012 of AND-gate 1046 may be set to a logical value of 1 (true) if, for a hash table selected through table select indicator 1004, the index of the input key is within the specified range and either the input key matches the key value 1062 that was read from DMEM 1028 or key validation was not selected. Otherwise, key valid output 1012 may be set to a logical value of 0 (false), indicating an invalid input key. In other embodiments (not shown in FIG. 10), addition circuit 1032 may be configured to perform modular integer addition modulo maximal index 1058 plus one. In such embodiments, index H(k) that is output by addition circuit 1032 may be bound to the range of 0 to maximal index 1058. In such embodiments, the comparator 1040 and AND-gate 1046 illustrated in FIG. 10 may not be needed and OR-gate 1044 may directly provide key valid output 1012. In the example illustrated in FIG. 10, data word output 1010 is set to the data word found at the address into DMEM 1028 that was output by integer adder 1038. If key valid output 1012 is set to a logical value of 1 (true), the data output on data word output 1010 represents valid data associated with the input key value at 1002.

In some embodiments, in addition to being able to read values that are associated with particular keys from a memory DMEM using the hash table evaluation circuits described herein, users (e.g., user applications) may be able to use the hash table evaluation circuits to load the memory DMEM with data values and (in some cases) the corresponding keys. For example, a user application may be configured to initialize one or more hash tables in the DMEM (after which it, or another user application or thread, may retrieve those values), or may be configured to update one or more hash tables (e.g., when the values associated with one or more of the keys change). In the example illustrated in FIG. 10, data write enable signal 1014 indicates whether or not the data word provided on data word input 1008 is to be written into DMEM 1028 at the address output by integer adder 1038. In this example, AND-gate 1048 may be configured to combine data write enable signal 1014 and key valid output 1012 and to output a write enable signal to DMEM 1028. The write enable signal to DMEM 1028 output by AND-gate 1048 is only set to a logical value of 1 (true) if both data write enable signal 1014 and key valid output 1012 are set to a logical value of 1 (true). Therefore, a write only occurs if the write is requested and the input key is valid. As previously noted, in some embodiments DMEM 1028 may be a dual-ported memory that allows for concurrent access to both a key value and an associated data word. While the data memory DMEM 1028 illustrated in FIG. 10 is configured to hold both key sets and data sets, in other embodiments, the DMEM may be implemented as two physical memories, one of which holds only key sets and the other of which holds only data sets.

Note that while FIG. 10 illustrates a hash table circuit 1000 in which computations and memory accesses are performed in combinational logic, in other embodiments these computations and memory accesses may be performed sequentially and may be divided into multiple pipeline stages by inserting registers. For example, in some embodiments, registers may be inserted before or after memories FMEM 1020/1022, CMEM 1024, GMEM 1026, and DMEM 1028. In some embodiments, registers may also be used to serialize the parallel accesses into memories GMEM 1026 and DMEM 1028 such that single-ported memories could be used instead of dual-ported memories. In embodiments in which hash table circuit 1000 supports key lookups only, but does not support data writes, hash table circuit 1000 may be implemented in a fully pipelined manner and may support one data word lookup per clock cycle in any one of the hash tables.

Note that, in various embodiments, each of memories FMEM 1020/1022, CMEM 1024, GMEM 1026, and DMEM 1028 may be implemented within a distinct physical memory, or any two or more of memories FMEM 1020/1022, CMEM 1024, GMEM 1026, and DMEM 1028 may be implemented within the same physical memory. The physical memories in which memories FMEM 1020/1022, CMEM 1024, GMEM 1026, and/or DMEM 1028 are implemented may each be single-ported or multi-ported and may utilize the same or different memory technologies, in different embodiments. For example, some of memories FMEM 1020/1022, CMEM 1024, GMEM 1026, and/or DMEM 1028 may be implemented using SRAMs while others may be implemented using DRAMs. In addition, some of memories FMEM 1020/1022, CMEM 1024, GMEM 1026, and/or DMEM 1028 may be located on the same chip while others may be located on different chips and/or may be composed of multiple chips. The ability to implement FMEM 1020/1022, CMEM 1024, GMEM 1026, and/or DMEM 1028 in a variety of technologies and/or to dynamically re-configure them (e.g., by repartitioning the allocation of memory locations in physical memories of different types to each of them) may allow them to be scaled up (if needed) if and when additional memory capacity becomes available (e.g., whether on-chip or off-chip). In various embodiments, each of the memories may or may not use parity values or error correction codes (ECC) to detect or correct bit errors in individual memory locations. To load and configure hash tables in memories FMEM 1020/1022, CMEM 1024, GMEM 1026, and DMEM 1028, each memory may, in various embodiments, include an additional port or means to share a physical port for the purpose of writing or reading data, where the means may include arbitration circuitry to allow access to each individual memory only when it is not accessed as part of a key lookup.

To further illustrate the operation of hash table circuit 1000, an example configuration for memories FMEM 1020/1022, CMEM 1024, GMEM 1026, and DMEM 1028 is shown in the tables below. In this example, the memories are configured to store three hash tables: hash table 0 maps 500 keys to corresponding data words, with 2 data words per key, and has key validation enabled; hash table 1 maps 200 keys to 1 data word per key and has key validation disabled; and hash table 2 maps 250 keys to 4 data words per key and has key validation enabled. In this example, it is assumed that memories FMEM 1020/1022 are configured to store pre-computed sums for three columns of matrices A1/A2, i.e., for each memory FMEM, three bits of the input key are used for the lower address bits and table select indicator 1004 is used for the higher address bits. Therefore, in each memory FMEM, the memory locations at addresses 0 through 7 hold pre-computed columns for hash table 0, the memory locations at addresses 8 through 15 hold pre-computed columns for hash table 1, and the memory locations at addresses 16 through 23 hold pre-computed columns for hash table 2. Table 1, below, illustrates one such memory FMEM, according to one embodiment.

TABLE 1

| Address | Value stored |
|---|---|
| 0 | Hash table 0: Pre-computed hash value 0 |
| 1 | Hash table 0: Pre-computed hash value 1 |
| ... | Hash table 0 |
| 7 | Hash table 0: Pre-computed hash value 7 |
| 8 | Hash table 1: Pre-computed hash value 0 |
| 9 | Hash table 1: Pre-computed hash value 1 |
| ... | Hash table 1 |
| 15 | Hash table 1: Pre-computed hash value 7 |
| 16 | Hash table 2: Pre-computed hash value 0 |
| 17 | Hash table 2: Pre-computed hash value 1 |
| ... | Hash table 2 |
| 23 | Hash table 2: Pre-computed hash value 7 |
| ... | |

FMEM

In this example, memory CMEM (shown below in Table 2) holds configuration parameter values for hash tables 0, 1, and 2 at addresses 0, 1, and 2, respectively. The parameters for which values are specified include a GMEM address offset parameter (such as that described above in reference to CMEM output 1050), a key address offset parameter (such as that described above in reference to CMEM output 1052), a key index multiplicand parameter (such as that described above in reference to CMEM output 1054), a hash table data address offset parameter (such as that described above in reference to CMEM output 1056), a maximal index parameter (such as that described above in reference to CMEM output 1058), and a key validation indicator (such as that described above in reference to CMEM output 1060). Note, however, that in this example, the key validation indicator bit values shown in Table 2 are inverted when compared to the values of CMEM output 1060 described above. For hash table 0, the GMEM address offset value is set to 0, as values for the secondary hash function occupy addresses 0 through 511 in memory GMEM. For hash table 1, the GMEM address offset value is set to 512, as values for the secondary hash function occupy addresses 512 through 767. And for hash table 2, the GMEM address offset value is set to 768, as values for the secondary hash functions occupy addresses 768 through 1023. Note that the number of addresses occupied in memory GMEM for a particular hash table may not be equal to the number of keys in that hash table, but may be a number close to the number of keys e.g., a power of 2 that is close to the number of keys.

TABLE 2

CMEM

| Address = Hash table # | GMEM offset | Data offset | Key offset | Index multiplicand | Maximal index | Key validation |
|---|---|---|---|---|---|---|
| 0 | 0 | 0 | 1000 | 2 | 499 | 1 |
| 1 | 512 | 1500 | 0 | 1 | 199 | 0 |
| 2 | 768 | 1700 | 2700 | 4 | 249 | 1 |
| ... | | | | | | |

In this example, for hash table 0, the data section in memory DMEM occupies addresses 0 through 999, and the key section in memory DMEM occupies addresses 1000 through 1499. Therefore, for hash table 0, the data offset value is set to 0 and the key offset value is set to 1000. For hash table 1, the data section in memory DMEM occupies addresses 1500 through 1699, and there is no key section as key validation is disabled. Therefore, for hash table 1, the data offset value is set to 1500 and the key offset value may be an arbitrary value (shown as 0, in this example). For hash table 2, the data section in memory DMEM occupies addresses 1700 through 2699, and the key section in memory DMEM occupies addresses 2700 through 2949. Therefore, for hash table 2, the data offset value is set to 1700 and the key offset value is set to 2700. For each hash table, the index multiplicand value is set to the number of data words per key for that hash table, and the maximal index value is set to the number of keys for that hash table minus one. For hash tables 0 and 2, the key validation indicator value is set to 1 (true) to enable key validation, while for hash table 1, the key validation indicator value is set to 0 (false) to disable key validation.

In this example, the configurations of memories GMEM (shown in Table 3 below) and DMEM (shown in Table 4 below) correspond to the parameters held in memory CMEM (shown in Table 2 above). For example, in memory GMEM, addresses 0 through 511 hold secondary hash values for hash table 0, although only 500 locations may actually be used (since hash table 0 has only 500 valid keys), addresses 512 through 767 hold secondary hash values for hash table 1 (although only 200 locations may actually be used), and addresses 768 through 1023 hold secondary hash values for hash table 2 (although only 250 locations may actually be used). In general, note that the number of available locations in memory GMEM may depend on, but may not be equal to, the number of keys in a hash table. For example, in some embodiments, the number of locations in memory GMEM may correspond to the number of nodes in a hash function graph (such as the hash function graph illustrated in FIG. 14 and described below), where each key represents an edge between two nodes.

TABLE 3

GMEM

| Address | Value stored |
|---|---|
| 0 | Hash table 0: Secondary hash value 0 |
| 1 | Hash table 0: Secondary hash value 1 |
| ... | Hash table 0 |
| 511 | Hash table 0: Secondary hash value 511 |
| 512 | Hash table 1: Secondary hash value 0 |
| ... | Hash table 1 |
| 767 | Hash table 1: Secondary hash value 255 |
| 768 | Hash table 2: Secondary hash value 0 |
| ... | Hash table 2 |
| 1023 | Hash table 2: Secondary hash value 255 |
| ... | ... |

The corresponding memory DMEM is shown below in Table 4.

TABLE 4

DMEM

| Address | Data type | Hash Table # | Key # | Data word # |
|---|---|---|---|---|
| 0 | Data | 0 | 0 | 0 |
| 1 | Data | 0 | 0 | 1 |
| 2 | Data | 0 | 1 | 0 |
| 3 | Data | 0 | 1 | 1 |
| ... | Data | 0 | | |
| 998 | Data | 0 | 499 | 0 |
| 999 | Data | 0 | 499 | 1 |
| 1000 | Key | 0 | 0 | |
| 1001 | Key | 0 | 1 | |
| ... | Key | | | |
| 1499 | Key | 0 | 499 | |
| 1500 | Data | 1 | 133 | 0 |

TABLE 4-continued

| | | DMEM | | |
|---|---|---|---|---|
| Address | Data type | Hash Table # | Key # | Data word # |
| 1501 | Data | 1 | 36 | 0 |
| ... | Data | 1 | | |
| 1699 | Data | 1 | 186 | 0 |
| 1700 | Data | 2 | 245 | 0 |
| 1701 | Data | 2 | 245 | 1 |
| 1702 | Data | 2 | 245 | 2 |
| 1703 | Data | 2 | 245 | 3 |
| ... | Data | 2 | | |
| 2696 | Data | 2 | 42 | 0 |
| 2697 | Data | 2 | 42 | 1 |
| 2698 | Data | 2 | 42 | 2 |
| 2699 | Data | 2 | 42 | 3 |
| 2700 | Key | 2 | 245 | |
| ... | Key | 2 | | |
| 2949 | Key | 2 | 42 | |
| ... | | | | |

In this example, memory DMEM (shown above in Table 4) holds both data values and key values at the offsets specified in memory CMEM by the data offset values for each of the hash tables and the key offset values for each of the hash tables. For example, the memory locations at addresses 0 through 999 hold data words for each of 500 valid keys (keys 0-499) for hash table 0, such that the two data words that are associated with each key value are stored in adjacent memory locations and can be individually selected according to the value of the data word selector input. The memory locations at addresses 1000 through 1499 store the values of the 500 valid keys for hash table 0 (keys 0-499). In this example, the memory locations at addresses 1500 through 1699 hold data words for each of 200 valid keys (keys 0-199) for hash table 1. However, since key validation is disabled for hash table 1, the key values themselves are not stored in the memory DMEM. As illustrated in Table 4, the memory locations at addresses 1700 through 2699 hold data words for each of 250 valid keys (keys 0-249) for hash table 2, such that the four data words that are associated with each key value are stored in adjacent memory locations and can be individually selected according to the value of the data word selector input. The memory locations at addresses 2700 through 2949 store the values of the 250 valid keys for hash table 2 (keys 0-249).

Note that in various embodiments, the keys and associated data stored in memory DMEM for each individual hash table may or may not be stored in order, depending on the minimal perfect hash function computed for that table. For example, while the entries holding data words and keys for hash table 0 are stored in order of their key numbers in their respective regions within the memory DMEM illustrated in Table 4, the entries for hash table 1 and hash table 2 are not stored in order of their key numbers in the memory DMEM. However, the data entries and corresponding key values for hash table 2 are stored in the same order in their respective regions within memory DMEM.

The example memory configuration described above illustrates that in some embodiments of the systems described herein, it may be possible to customize and/or optimize the utilization of the available memory resources, e.g., by partitioning memory DMEM according to the number of hash tables, the number of keys supported per hash table, the number of data words per key that are stored in each individual hash table, and/or whether key validation is enabled for each hash table (indicating that a key section is needed for the hash table).

Figure 11:
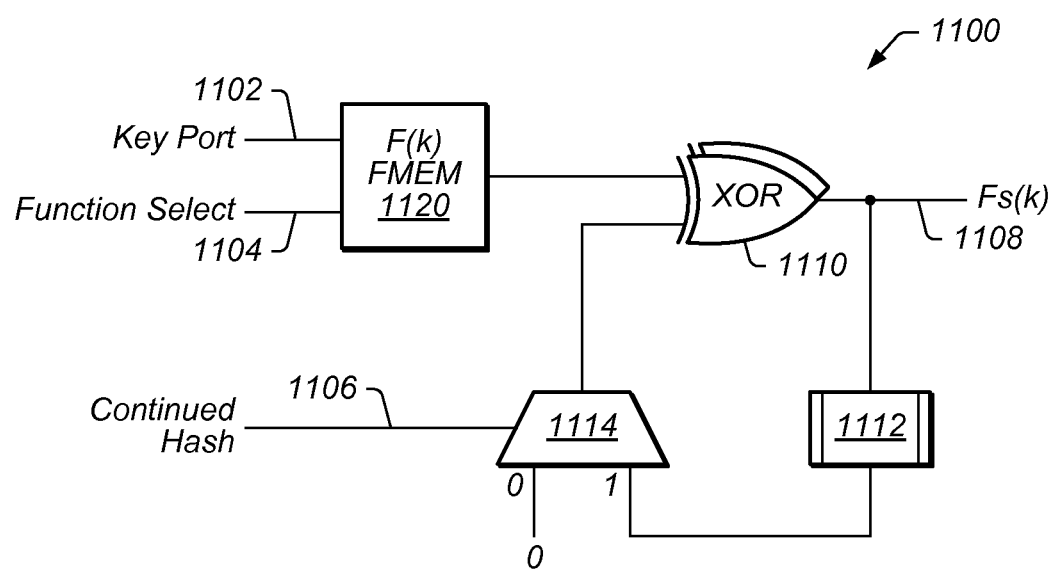
FIG. 11 is a block diagram illustrating a primary hash function circuit that is configured to compute a primary hash function over a wide key by combining hash values computed in multiple clock cycles for different portions of the wide key, according to one embodiment.

Some applications may require the evaluation of keys having widths that exceed the bit width of the key input (e.g., key input 1002 of FIG. 10). In some embodiments, the hash table circuits described herein may be configured to compute primary hash functions F1(k) and F2(k) on portions of such keys and to combine the hash values computed over the portions into two final hash values. One embodiment of a primary hash function circuit that is configured to compute a primary hash function over a wide key by combining hash values computed in multiple clock cycles for different portions of the wide key is illustrated in FIG. 11. More specifically, FIG. 11 illustrates a primary hash function circuit 1100 that computes a primary hash function F(k) over a key k by combining hash values computed in multiple clock cycles for portions $k_0, \ldots, k_{s-1}$ of k. In each clock cycle, a portion $k_i$ of key k is provided on key port 1102 together with a function select signal 1104. In this example, function select signal 1104 may be used to select a particular linear hash function stored in linear hash function circuit 1020 that is to be applied to $k_i$. In various embodiments, the same linear hash function may be applied to all portions $k_i$ of key k or different hash functions may be applied to different portions $k_i$.

In the example illustrated in FIG. 11, for the first portion $k_0$ of k provided in the first clock cycle, continued hash signal 1106 may be set to a logical value of 0 (false), indicating that the computation being performed in the first clock cycle is not a continuation of an evaluation of key k that is already in progress (i.e., one that began in a previous clock cycle). In this case, multiplexer 1114 would output a value of 0 and XOR-gate array 1110 would directly output the hash value computed by linear hash function circuit 1120, which is then stored in register 1112. In subsequent clock cycles, subsequent portions $k_i$ of k may be provided on key port 1102 while continued hash signal 1106 is set to a logical value of 1 (true), indicating that the computation being performed in these cycles are part of an evaluation of key k that is already in progress. In response, multiplexer 1114 would output a running sum of previous hash values, which is then stored in register 1112. In each of these subsequent clock cycles, the running sum of previous hash values would be combined with the current linear hash value computed over $k_i$ (i.e., for the next portion of key k) in XOR-gate array 1110 (e.g., using a bit-wise XOR operation) with the result being stored back into register 1112.

In some embodiments, if a different primary hash function is used for every portion of k, circuit 1100 may be configured to generate unique hash values for keys wider than key port 1102 by concatenating multiple hash matrices. For example, (referring to Equation 1, shown above), in some embodiments s matrices $A_0, \ldots, A_{s-1}$ of p×r bits may be concatenated to form a single matrix A=concat($A_0, \ldots, A_{s-1}$) of p×sr bits. In such embodiments, matrix A may be used to generate a p-bit linear hash value in a matrix multiplication with a key k of sr bits. Using this approach, circuit 1100 may be configured to generate hash values for keys k of arbitrary bit length sr by accumulating matrix multiplications $A_i*k_i$ for i from 0 to s−1, such that in each cycle, $A_i$ is selected through function select signal 1104, key portion $k_i$ is provided on key port 1102, and a running sum (using addition modulo 2) is stored in register 1112. Upon multiplication of $A_{s-1}*k_{s-1}$, circuit 1100 outputs the result of the full A*k matrix multiplication on output F(k) 1108.

Note that in some embodiments, for long keys, memory DMEM 1028 may store each key across multiple addresses and key validation may be performed in multiple clock cycles, where a portion of the key is validated in each clock cycle. Alternatively, for the purpose of key validation, memory DMEM 1028 may not store long keys directly, but may instead store the primary hash values F1 and F2 of the keys. While this approach may reduce the amount of memory needed for key validation, it may in some cases introduce security vulnerabilities, as there may be invalid keys with primary hash values identical to those of valid keys.

Note that while the circuits illustrated in FIGS. 3, 4, 5, 7, 8, 10, and 11 illustrate various computations and memory accesses that are performed with combinational logic, in other embodiments, some or all of the computations and memory accesses described herein may be performed sequentially and may be divided into multiple pipeline stages.

Figure 12:
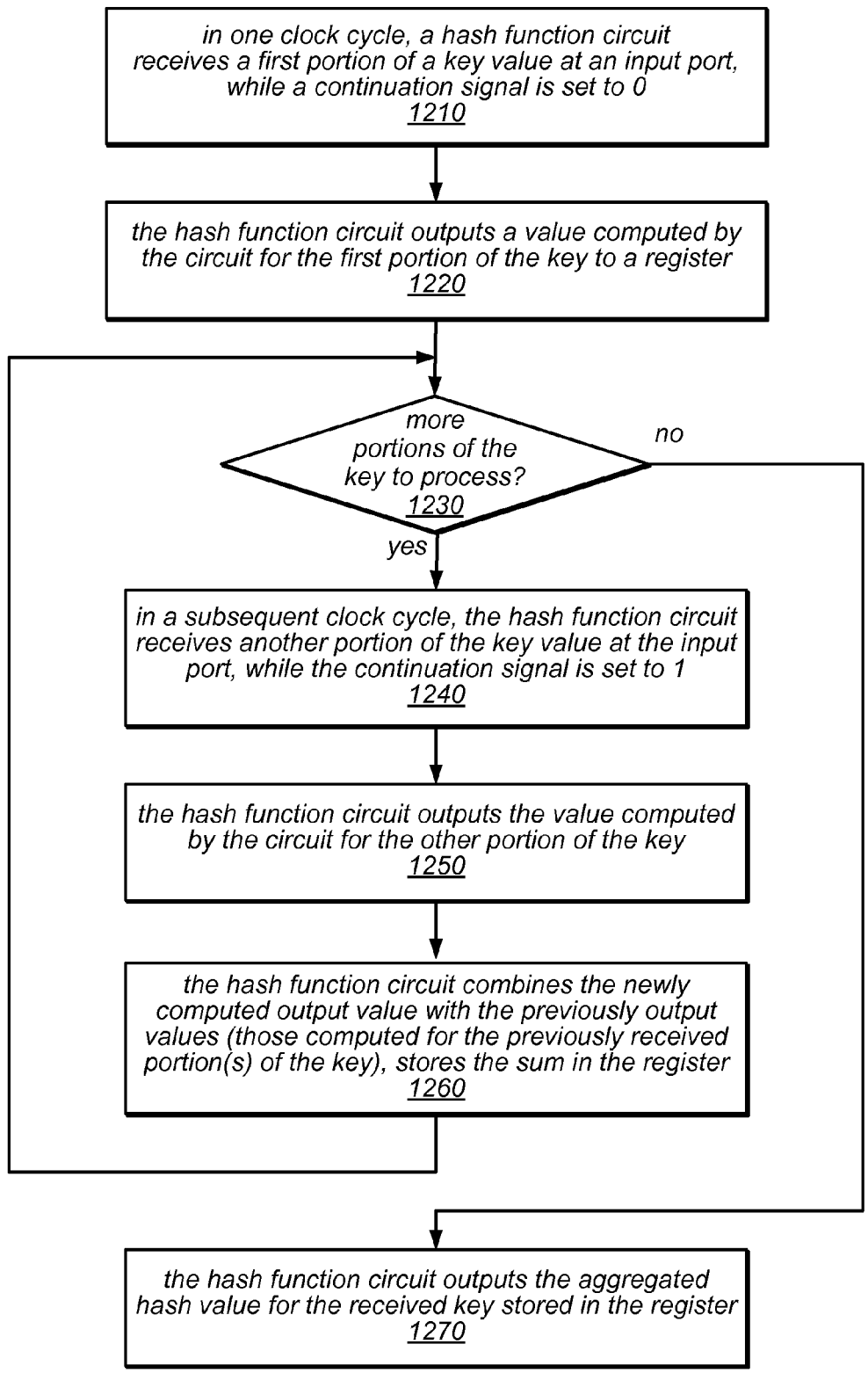
FIG. 12 is a flow diagram illustrating one embodiment of a method for evaluating a hash function when the input includes wide key values.

One embodiment of a method for evaluating a hash function when the input includes wide key values is illustrated by the flow diagram in FIG. 12. As illustrated in this example, the method may include, in one clock cycle, a hash function circuit receiving a first portion of a key value at an input port, while a continuation signal is set to 0 (as in 1210). The method may include the hash function circuit outputting a value computed by the circuit for the first portion of the key to a register (as in 1220). For example, the hash function circuit may apply a selected primary hash function to the portion of the key and may output the result to a register, as described above. While there are additional portions of the key to be processed (shown as the positive exit from 1230), the method may include, in each of one or more subsequent clock cycles, the hash function circuit receiving an additional portion of key value at the input port, while the continuation signal is set to 1 (as in 1240).

As illustrated in FIG. 12, in response to receiving each additional portion of the key value, the method may include the hash function circuit outputting a value computed by the circuit for the additional portion of the key, as in 1250. For example, the hash function circuit may apply the same primary hash function or a different primary hash function to each subsequently received portion of the key and may output the result, as described above. The method may also include the hash function circuit combining the newly computed output value with a running sum of the previously computed output values (e.g., those computed for the previously received portion(s) of the key), and storing the new running sum in the register (as in 1260). As illustrated by the feedback from 1260 to 1230, in this example, the operations illustrated in elements 1240, 1250, and 1260 may be repeated for each additional portion of the key value that is received. Once there are no additional portions of the input key value to be received and processed (or if the entire input key was received in the first single clock cycle), the method may include the hash function circuit outputting an aggregated hash value for the received key. This is illustrated in FIG. 12 by the path from the negative exit from 1230 to 1270.

As previously noted, in some embodiments, the system in which the circuits and techniques described herein are employed may be a user-programmable device and the hash tables described herein may be generated based on a user-provided program and/or user-provided table data, which may not be known at circuit design time. In some embodiments, the system may be configured to allow the user to create a variable number of hash tables (e.g., tables that map key values to data words according to different minimal perfect hash functions), and each of the hash tables may support a different key size, a different number of keys, and/or differently-sized data entries associated with each key than other tables. In some embodiments, the system may include mechanisms for selecting the hash functions that are programmed into the hardware circuitry described herein following its fabrication, and for loading representations of those hash functions (and the lookup tables that map a set of key values to corresponding data word, according to those hash functions) into various memories within the hardware circuitry (e.g., into the memories FMEM. GMEM, CMEM, and/or DMEM).

Figure 13:
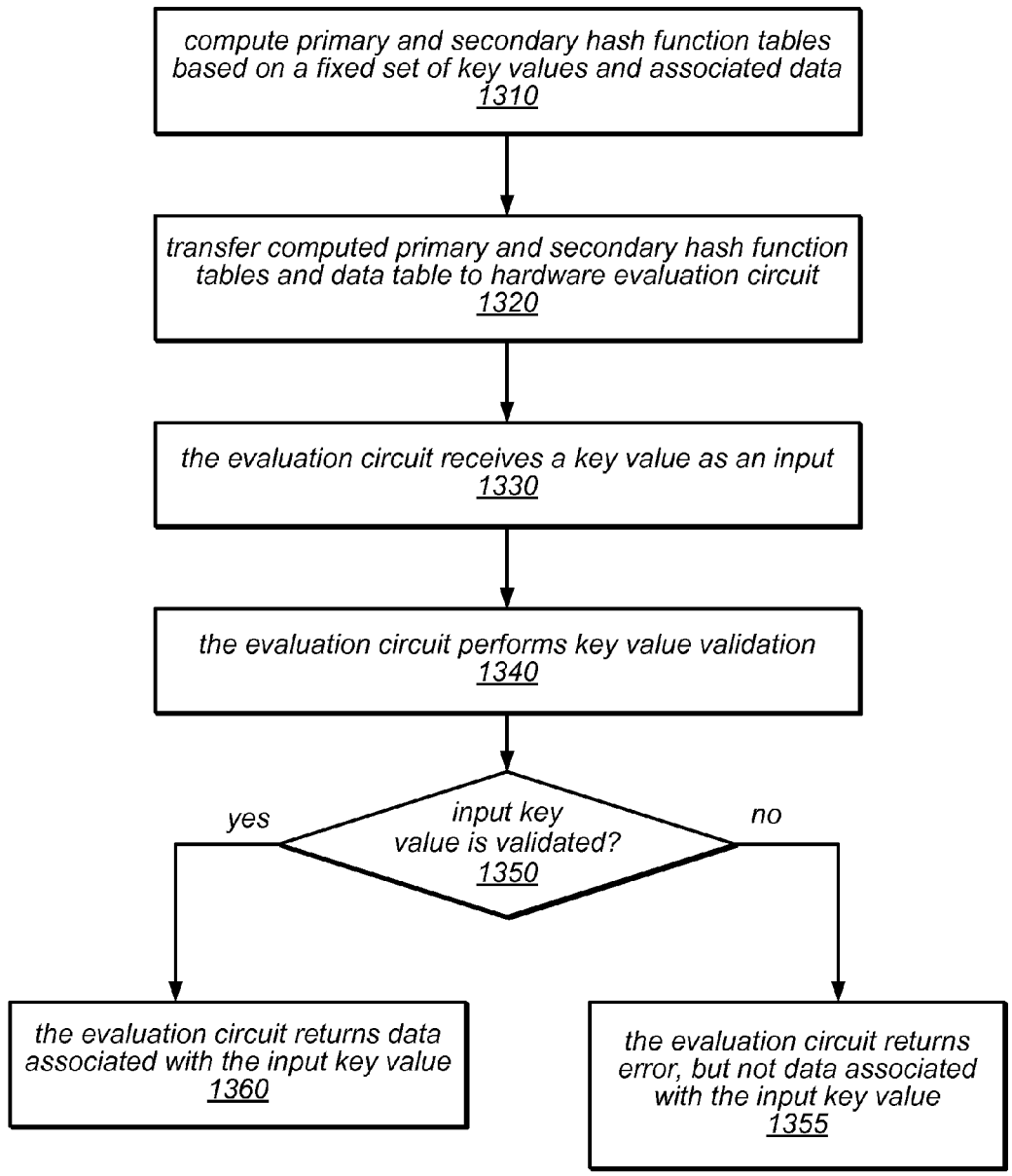
FIG. 13 is a flow diagram illustrating one embodiment of a method for configuring and then utilizing a hash function evaluation circuit.

One embodiment of a method for configuring and then utilizing a hash function evaluation circuit is illustrated by the flow diagram in FIG. 13. As illustrated in this example, the method may include computing primary and secondary hash function tables based on a fixed set of key values and associated data (as in 1310). For example, in embodiments in which a user or programmer can define a mapping between valid key values and associated data words (e.g., in a comma-separated values file), program instructions may be used to determine the maximum key size, the number of keys supported, and the number and/or size of the data words associated with the keys, and to generate a hash function evaluation circuit configuration that implements a minimal perfect hash function based on that information (including the appropriate primary and second hash function tables for the minimal perfect hash function). In some embodiments, the method may include computing respective primary and secondary hash functions for multiple minimal perfect hash functions, one of which will be selected when a key is presented for evaluation. The method may also include transferring the computed primary and secondary hash function tables and the corresponding data table to the hardware evaluation circuit (as in 1320). For example, transferring the computed primary and secondary hash function tables and data table to the hardware evaluation circuit may involve writing a representation of one or more of the tables into a memory (e.g., an SRAM, DRAM, EEPROM, etc.) and/or loading a representation of one or more of the tables into one or more re-programmable components of another type (e.g., one or more FPGAs), in different embodiments.

As illustrated in this example, subsequent to transferring the hash function tables to the evaluation circuit, the method may include the evaluation circuit receiving a key value as an input (as in 1330), and the evaluation circuit performing a key value validation (as in 1340), as described herein. If the input key value is validated (shown as the positive exit from 1350), the method may include the evaluation circuit returning data that is associated with the input key value (as in 1360). However, if the input key value is not validated (shown as the negative exit from 1350), the method may include the evaluation circuit returning an indication of an error condition, but not returning any data that is associated with the input key value (as in 1355). In other embodiments, if the input key value is not validated (shown as the negative exit from 1350), the method may include the evaluation circuit returning data that is associated with the input key value, but also returning an indication that the input key (and thus, the returned data) is not valid.

Figure 14:
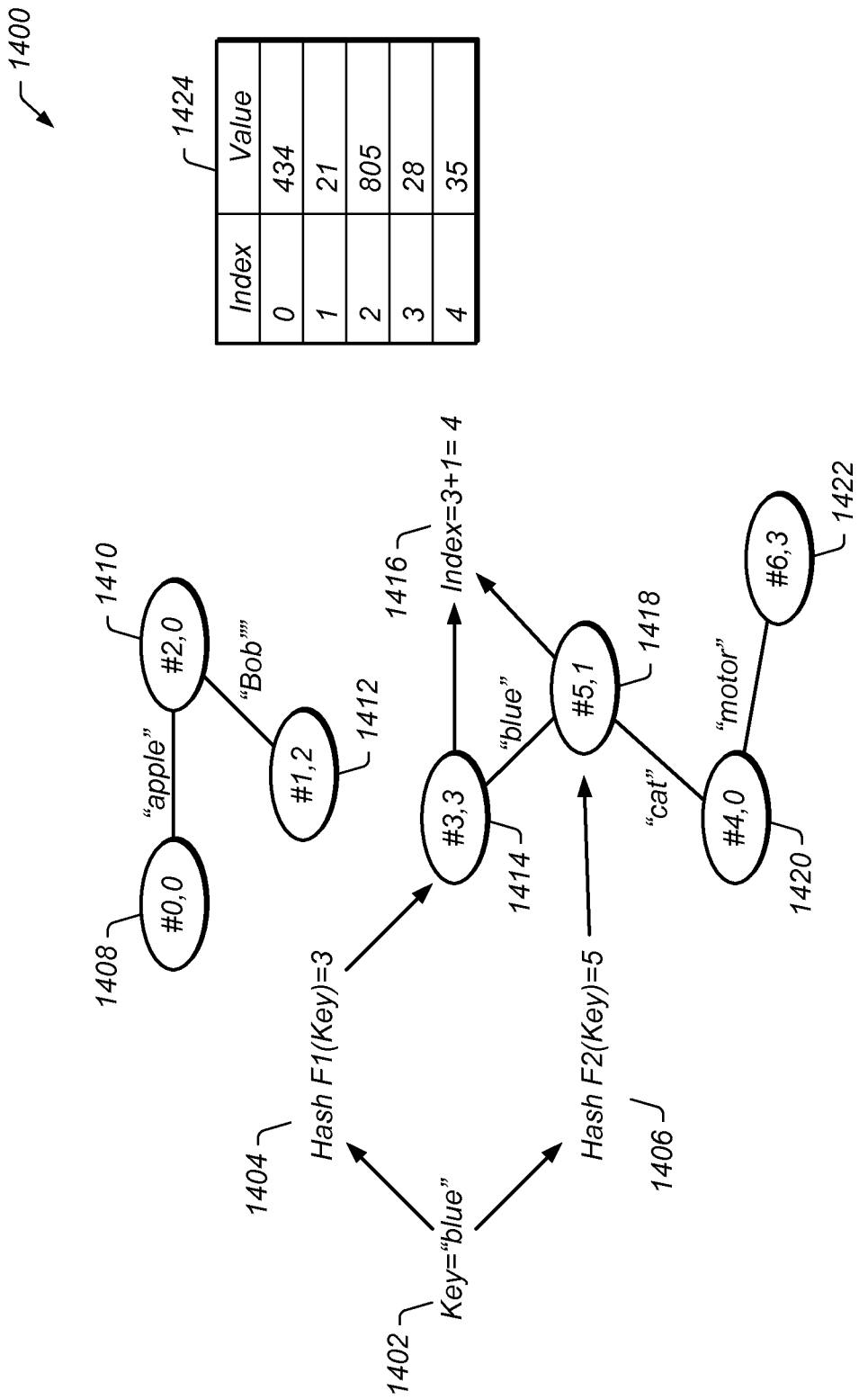
FIG. 14 illustrates the generation of an index into a lookup table from an input key value, according to one embodiment.

The systems and methods described herein for evaluating a perfect hash function for a key value may be further illustrated by the diagram in FIG. 14. More specifically, FIG. 14 illustrates the generation (by a circuit 1400) of an index into a lookup table 1424 from an input key value k, according to one embodiment. In this example, the set of valid keys for lookup table 1424 includes five key values. More specifically:

k∈{"apple", "blue", "cat", "motor", "Bob"}

In this example, two primary hash functions are applied to the input key value k (e.g., by two primary hash function circuits, each of which may include a respective memory FMEM) to obtain respective addresses/indexes into a secondary hash function circuit (e.g., a memory GMEM). In some embodiments, for the purpose of computing primary hash values, the keys may be represented as bit vectors using a character encoding scheme, e.g., the American Standard Code for Information Interchange (ASCII). For example, using ASCII encoding, the key "cat" may be represented as a bit vector 0110_0011_0110_0001_0111_0100. These addresses/indexes serve as inputs to the secondary hash function circuit, which generates two different values (one corresponding to each of the outputs of the primary hash function circuits). The two outputs of the secondary hash function circuit are then combined to generate an address/index into the lookup table 1424 to obtain a data value that is associated with the input key value k.

In this example, each pair of ovals connected by a line represents the mappings between the two primary hash values associated with a particular key value and the corresponding values generated by the secondary hash function circuit (e.g., obtained from the GMEM). For example, for the key value "apple", a first primary hash function value 0 (which is an output of one of two primary hash function circuits) serves as an address/index into the GMEM to obtain a value of 0 (shown in oval 1408), and the other primary hash function value 2 (which is an output of the other one of the two primary hash function circuits) serves as an address/index into the GMEM to obtain a value of 0 (shown in oval 1410). Similarly, for the key value "motor", the first primary hash function value 4 serves as an address/index into the GMEM to obtain a value of 0 (as in 1420), and the other primary hash function value 6 serves as an address/index into the GMEM to obtain a value of 3 (as in 1422).

Note that, in this example, two different keys can generate one of the same primary hash values, but cannot generate the same secondary hash function value. For example, for the key value "cat", the first primary hash function value 4 serves as an address/index into the GMEM to obtain a value of 0 (as in 1420), just as was the case for the key value "motor". However, the other primary hash function value for the key value "cat", which is 5, serves as an address/index into the GMEM to obtain a value of 1 (as in 1418). Therefore, the respective addresses/indexes into data table 1424 generated by the secondary hash function circuit for the key values "motor" and "cat" (which represent the sums of the two values obtained from the GMEM by the outputs of the primary hash function circuits) are different. In the example illustrated in FIG. 14, the index generated by the secondary hash function circuit (GMEM) for the key value "motor" is 3 (0+3), and the index generated by the secondary hash function circuit (GMEM) for the key value "cat" is 1 (0+1).

Similarly, for the key value "Bob", the second primary hash function value 2 serves as an address/index into the GMEM to obtain a value of 0 (as in 1410), just as was the case for the key value "apple". However, the first primary hash function value for the key value "Bob", which is 1, serves as an address/index into the GMEM to obtain a value of 2 (as in 1412). In this example, the index generated by the secondary hash function circuit (GMEM) for the key value "apple" is 0 (0+0), and the index generated by the secondary hash function circuit (GMEM) for the key value "Bob" is 2 (0+2).

In this example, the input key value 1402 is "blue". As illustrated in FIG. 14, applying the first primary hash function to this key (i.e., Hash F1(key), shown at 1404) returns a value of 3. When this Hash F1(key) value is used as an index into the memory GMEM, the GMEM returns a value of 3, which is found at address/index 3 in the memory GMEM (as shown at 1414). In this example, applying the second primary hash function to this key (i.e., Hash F2(key), shown at 1406) returns a value of 5. When this Hash F2(key) value is used as an index into the memory GMEM, the GMEM returns a value of 1, which is found at address/index 5 in the memory GMEM (as shown at 1418). In this example, the two values obtained from the GMEM (i.e., 3 and 1) are then combined at 1416 (in this example, using addition) to generate an address/index into lookup table 1424 of 4, which maps to an associated data value of 35. Therefore, in response to receiving a key value input of "blue", the evaluation circuit 1400 returns a data value of 35.

Figure 15:
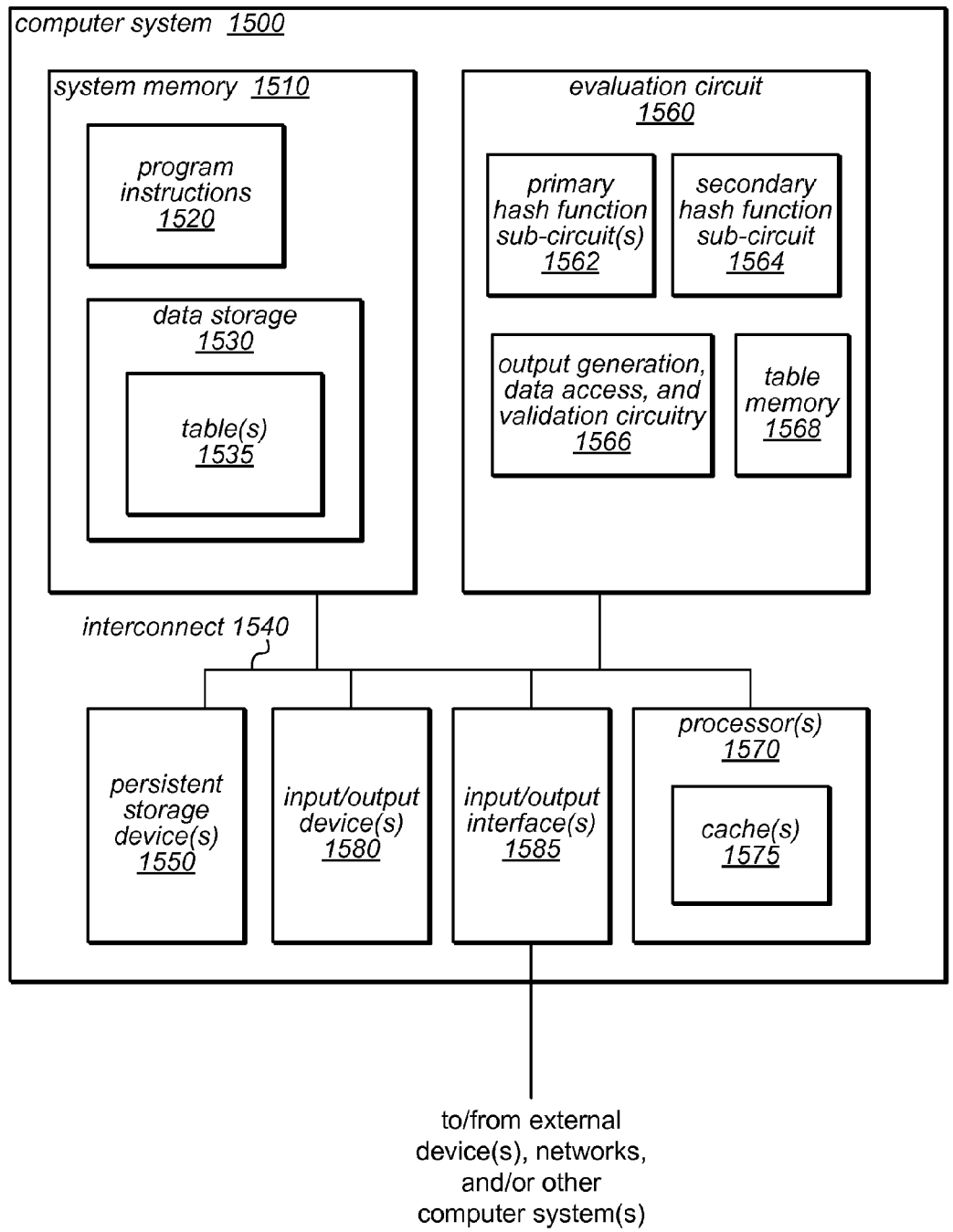
FIG. 15 is a block diagram illustrating one embodiment of a computing system that is configured to implement configuring perfect hash function circuits and/or evaluating perfect hash functions using such circuits.

The techniques described herein for implementing and configuring perfect hash function circuits, evaluating perfect hash functions using such circuits, and/or accessing data in a lookup table using these techniques may be implemented on or by any of a variety of computing systems, in different embodiments. For example, the hash function evaluation circuits described herein may be implemented in various circuit-level network processing devices including network interface cards, network processors, smart routers/switches, etc., according to different embodiments. In different embodiments, these circuits may be implemented within a single hardware device (e.g., a single chip, card, and/or apparatus), or the functionality of these circuits may be partitioned across multiple hardware devices (e.g., multiple chips on the same card or on different cards). FIG. 15 illustrates a computer system 1500 that is configured to implement configuring perfect hash function circuits, evaluating perfect hash functions using such circuits, and/or accessing data in a lookup table using these techniques, according to various embodiments. The computer system 1500 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

In various embodiments, one or more of the mechanisms for implementing configuring perfect hash function circuits, evaluating perfect hash functions using such circuits, and/or accessing data in a lookup table using these techniques, as described herein, may be provided as a computer program product, or software, that may include a non-transitory, computer-readable storage medium having stored thereon instructions, which may be used to program a computer system 1500 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette or hard disk); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1500 may include one or more processors 1570; each may include multiple cores, any of which may be single or multi-threaded. For example, multiple processor cores may be included in a single processor chip (e.g., a single processor 1570), and multiple processor chips may be included in computer system 1500. Each of the processors 1570 may include a cache or a hierarchy of caches 1575, in various embodiments. For example, each processor chip 1570 may include multiple L1 caches (e.g., one per processor core) and one or more other caches (which may be shared by the processor cores on a single processor). The computer system 1500 may also include one or more persistent storage devices 1550 (e.g. optical storage, magnetic storage, hard drive, tape drive, solid state memory, etc.) one or more system memories 1510 (e.g., one or more of cache, SRAM, DRAM, RDRAM, EDO RAM, DDR 10 RAM, SDRAM, Rambus RAM, EEPROM, etc.), one or more input/output interfaces 1585, and/or one or more input/output devices 1580 (e.g., keyboards, monitors, etc.). Other embodiments may include more, fewer, or different components than those illustrated in FIG. 15. For example, some embodiments may include additional components not illustrated in FIG. 15 (e.g., video cards, audio cards, additional network interfaces, peripheral devices, a network interface such as an ATM interface, a Frame Relay interface, an Ethernet interface, an Infiniband interface, etc.)

As illustrated in FIG. 15, the one or more processors 1570, the storage device(s) 1550, the input/output devices 1580, the input/output interfaces 1585, and the system memory 1510 may be coupled to the system interconnect 1540. One or more of the system memories 1510 may contain program instructions 1520. Program instructions 1520 may be executable to implement one or more applications, which may include application source code and/or executable application code that is configured to generate a hash function evaluation circuit configuration that implements a minimal perfect hash function, program a hash function evaluation circuit to implement a minimal perfect hash function, and/or initiate a table lookup operation that uses a hash function evaluation circuit to access the data associated with a presented key, as described herein. In some embodiments, program instructions 1520 may also include shared libraries, operating systems, or a compiler (e.g., one that compiles a user program written in a domain-specific programming language and/or a comma-separated values file to generate a hash function evaluation circuit configuration that implements a minimal perfect hash function).

Program instructions 1520 may be encoded in platform native binary, any interpreted language such as Java™ bytecode, or in any other language such as C/C++, Java™, etc., or in any combination thereof. In various embodiments, components and/or functions implemented by program instructions 1520 (e.g., compilers, applications, operating systems, and/or shared libraries) may each be implemented in any of various programming languages or methods. For example, in one embodiment, one or more components or functions implemented by program instructions 1520 may be Java based, while in another embodiment they may be written using the C or C++ programming languages. Similarly, applications may be written using Java, C, C++, or another programming language, according to various embodiments. Moreover, in some embodiments, the different components or functions implemented by program instructions 1520 may not be implemented using the same programming language. For example, an application implemented by program instructions 1520 may be C++ based, while a compiler implemented by program instructions 1520 may be developed using C.

In various embodiments, the program instructions 1520 may include any or all of the functions, operations, or procedures, and/or other processes for implementing configuring perfect hash function circuits, evaluating perfect hash functions using such circuits, and/or accessing data in a lookup table using these techniques, as described herein. The system memory 1510 may further comprise data storage locations 1530 where data may be stored. For example, in some embodiments, data storage locations 1530 may store data that is associated with one or more sets of keys in lookup tables (e.g., data storage locations 1530 may include storage for one or more memories DMEM). In other embodiments, data storage locations 1530 may store data in one or more hash tables, or may store parameter values, configuration information, and/or any other data usable to implement the techniques described herein using one or more hash evaluation circuits, some of which may include values that are configurable by the programmer or by a user (e.g., data storage locations 1530 may include storage for one or more memories FMEM, CMEM, or GMEM).

As illustrated in FIG. 15, in some embodiments, computer system 1500 may include one or more hash evaluation circuits, such as evaluation circuit 1560. As illustrated in this example, each evaluation circuit 1560 may include one or more primary hash function sub-circuit(s) 1562, a secondary hash function sub-circuit 1564, and circuitry 1566 for performing output generation, data access, and key validation. In this example, evaluation circuit 1500 also includes table memory 1568, which may include one or more memories FMEM, CMEM, GMEM, and/or DMEM, each of which may store one or more hash tables, such as those described herein. In other embodiments, one or more of these hash tables may be stored in memory included within primary hash function sub-circuits 1562, secondary hash function sub-circuit 1564, and/or output generation, data access, and validation circuitry 1566.

In some embodiments, interconnect 1540 may be configured to couple processor(s) 1570 and/or evaluation circuit 1560 directly to a computer system network. In other embodiments, these (or other) components of computer system 1500 may be coupled to one or more external devices, network(s), and/or other computer system(s) through interconnect 1540 and input/output interface(s) 1585. For example, in some embodiments, computer system 1500 may include an interface 1585 through which network packets are received from one or more other computer systems (some of which may be similar to computer system 1500). These packets may then be routed to evaluation circuit 1560 in order to perform a table lookup operation on information (keys) contained in those packets, as described herein. In some embodiments, interconnect 1570 and input/output interface(s) 1585 may be configured to implement one or more of various interface or network standards, e.g., Peripheral Component Interconnect (PCI), Ethernet, HyperTransport (HT), Infiniband, or any variant or successor of these or other suitable input/output protocols. In other embodiments, one or more of interconnect 1570 and input/output interface(s) 1585 may be configured to implement a custom interface.

Although the embodiments above have been described in considerable detail, numerous variations and modifications will become apparent to those skilled in the art once the above disclosure is fully appreciated. For example, although many of the embodiments are described in terms of particular types of data structures (e.g., hash tables), it should be noted that the techniques and mechanisms disclosed herein for implementing configuring perfect hash function circuits, evaluating perfect hash functions using such circuits, and/or accessing data in a lookup table using these techniques may be applicable in other contexts and/or using structures and procedures other than those described in the examples herein. It is intended that the following claims be interpreted to embrace all such variations and modifications.

What is claimed:

1. A circuit configured to evaluate at least one perfect hash function, comprising:
   an input configured to receive a key value;
   two primary hash function sub-circuits coupled to the input;
   a secondary hash function sub-circuit; and
   at least one memory;
   wherein each of the primary hash function sub-circuits is configured to perform carry-free arithmetic that applies a respective linear hash function to the key value to produce a respective primary hash value, and
   wherein the secondary hash function sub-circuit is configured to:
      receive the respective primary hash values from the two primary hash function sub-circuits; and
      generate a secondary hash value dependent on the received primary hash values, wherein the secondary hash value is usable to access a data value stored in the at least one memory that is associated with the key value.

2. The circuit of claim 1,
   wherein the at least one memory stores a representation of each of the respective linear hash functions; and
   wherein to apply the respective linear hash function to the key value, each of the primary hash function sub-circuits is configured to access the representation of the respective linear hash function stored in the at least one memory.

3. The circuit of claim 1,
   wherein the at least one memory stores a representation of a secondary hash function; and
   wherein to generate the secondary hash value, the secondary hash function sub-circuit is configured to access the representation of the secondary hash function stored in the at least one memory.

4. The circuit of claim 3,
   wherein to generate the secondary hash value, the secondary hash function sub-circuit is configured to:
      obtain a respective value associated with each of the received primary hash values from the at least one memory; and
      aggregate the respective values associated with each of the received primary hash values using unsigned integer addition, signed integer addition, modular integer addition, or a bit-wise XOR operation.

5. The circuit of claim 1,
   wherein the circuit further comprises an input configured to receive a hash function selection value;
   wherein the at least one memory stores a plurality of representations of linear hash functions;
   wherein the at least one memory stores a plurality of representations of secondary hash functions; and
   wherein the hash function selection value induces selection of at least one of: a representation of a linear hash function to be accessed by one of the primary hash function sub-circuits, or a representation of a secondary hash function to be accessed by the secondary hash function sub-circuit.

6. The circuit of claim 5,
   wherein the hash function selection value induces selection of one of a plurality of sets of configuration parameter values, each set of configuration parameter values being associated with a respective one of a plurality of lookup tables stored in the at least one memory;
   wherein the secondary hash function sub-circuit is configured to generate the secondary hash value dependent on the selected one of the plurality of sets of configuration parameter values; and
   wherein the secondary hash value is usable to access the data value in one of the plurality of lookup tables in the at least one memory dependent on the selected one of the plurality of sets of configuration parameter values.

7. The circuit of claim 1,
   wherein the circuit further comprises an input configured to receive a word selection parameter value; and
   wherein the word selection parameter value induces selection of the data value stored in the at least one memory from among a plurality of data values stored in the at least one memory that are associated with the key value.

8. The circuit of claim 1,
   wherein the at least one memory is configured to store, for each of a plurality of key values, one or more data values that are associated with the key value;
   wherein at least one of the number of data values stored in the at least one memory that are associated with each key value or the size of the data values stored in the at least one memory is configurable without a hardware modification to the circuit.

9. The circuit of claim 1,
   wherein the data value is stored in the at least one memory in an entry of a lookup table;
   wherein the at least one memory further comprises a table configured to store a value for each of one or more configuration parameters of the lookup table; and
   wherein the configuration parameters of the lookup table specify one or more of: a key size for the lookup table, a number of key values for the lookup table, a size for data values stored in the lookup table, a number of data values associated with each key value in the lookup table, or a value of a signal indicating whether received key values are to be validated by the evaluation circuit.

10. The circuit of claim 1,
    wherein the data value is stored in the at least one memory in an entry of a lookup table;
    wherein the lookup table further stores a key value that is associated with the data value; and
    wherein the circuit further comprises a validation sub-circuit configured to:
       compare the key value stored in the at least one memory that is associated with the data value and the key value received by the input;
       determine whether the key value stored in the at least one memory that is associated with the data value matches the key value received by the input; and
       output an indication of a result of the determination.

11. The circuit of claim 1,
    wherein the key value is represented by a bit vector comprising plurality of bits; and
    wherein to apply a respective linear hash function to the key value to produce a respective primary hash value, each of the primary hash function sub-circuits is configured to multiply the bit vector by a pre-defined bit matrix.

12. The circuit of claim 11, wherein to apply a respective linear hash function to the key value to produce a respective primary hash value, each of the primary hash function sub-circuits is further configured to add a pre-defined constant bit vector to a result of the multiplication.

13. The circuit of claim 1, wherein to perform carry-free arithmetic that applies a respective linear hash function to the key value, each of the primary hash function sub-circuits is configured to perform polynomial arithmetic over a Galois field.

14. A method for evaluating a perfect hash function, comprising:
performing, by an evaluation circuit:
receiving a given key value;
applying a first primary hash function to the given key value to produce a first primary hash value;
applying a second primary hash function to the given key value to produce a second primary hash value;
generating a secondary hash value dependent on the first and second primary hash values; and
accessing a data value in a lookup table that is associated with the given key value, wherein said accessing is dependent on the secondary hash value;
wherein at least one of said applying a first primary hash function and said applying a second primary hash function comprises performing carry-free arithmetic to produce a respective primary hash value dependent on the given key value.

15. The method of claim 14, further comprising:
prior to said receiving:
generating a representation of the first primary hash function;
generating a representation of the second primary hash function;
generating a representation of the secondary hash function; and
transferring the representations of the first primary hash function, the second primary hash function, and the secondary hash function to the evaluation circuit.

16. The method of claim 15,
wherein said transferring comprises storing the representations of the first primary hash function, the second primary hash function, and the secondary hash function in one or more memories in the evaluation circuit;
wherein the method further comprises, subsequent to said accessing:
generating a representation of another primary hash function or another secondary hash function;
replacing the representation of the first or second primary hash function stored in the one or more memories with the representation of the other primary hash or replacing the representation of the secondary hash function stored in the one or more memories with the representation of the other secondary hash function;
receiving the given key value;
applying first and second primary hash functions to the given key value to produce first and second primary hash values for the given key value;
generating another secondary hash value dependent on the first and second primary hash values for the given key value; and
accessing a data value in a lookup table that is associated with the given key value, wherein said accessing is dependent on the other secondary hash value;
wherein at least one of the first and second primary hash values for the given key value or the other secondary hash value is dependent on the representation of the other primary hash function or the representation of the other secondary hash function.

17. The method of claim 14, further comprising:
prior to said receiving, storing a plurality of data values in the lookup table, wherein the plurality of data values comprises the data value;
subsequent to said accessing:
replacing at least one of the plurality of data values stored in the lookup table with a different data value, wherein the at least one of the plurality of data values comprises the data value in the lookup table that is associated with the given key value;
receiving the given key value; and
accessing the different data value in the lookup table that is associated with the given key value.

18. The method of claim 17, further comprising:
wherein said storing is dependent on values of one or more configuration parameters for the lookup table that are stored in a table in the evaluation circuit;
wherein the one or more configuration parameter values specify one or more of: a key size for the lookup table, a number of key values for the lookup table, a size of data values stored in the lookup table, a number of data values associated with each key value in the lookup table, or a value of a signal indicating whether received key values are to be validated by the evaluation circuit; and
wherein at least one of said generating a secondary hash value or said accessing the data value in the lookup table is dependent on the one or more configuration parameter values.

19. The method of claim 14, further comprising:
prior to said receiving, storing representations of the first primary hash function, the second primary hash function, and the secondary hash function in one or more memories in the evaluation circuit, wherein said storing comprises partitioning the one or more memories into a plurality of regions in which respective portions of the representations of the first primary hash function, the second primary hash function, and the secondary hash function are to be stored, and wherein said partitioning is dependent on one or more of: a key size specified for the lookup table, a number of key values specified for the lookup table, a size specified for data values stored in the lookup table, a number of data values associated with each key value in the lookup table, or a value of a signal indicating whether received key values are to be validated by the evaluation circuit.

20. A system, comprising:
an input configured to receive one key value at a time;
a memory comprising a lookup table, wherein the lookup table is configured to store, for each of a plurality of key values, at least one data value that is associated with the key value, and wherein each stored data value is associated with a single, respective one of the plurality of key values; and
a perfect hash function evaluation circuit;
wherein, for each key value that is received by the input, the perfect hash function circuit is configured to:
apply a first primary hash function to the key value to produce a first primary hash value;
apply a second primary hash function to the key value to produce a second primary hash value;
generate a secondary hash value dependent on the first and second primary hash values; and
access a data value in the lookup table that is associated with the key value dependent, at least in part, on the secondary hash value;
wherein to apply at least one of the first primary hash function and the second primary hash function, the perfect hash function circuit is configured to perform carry-free arithmetic to produce the respective primary hash value dependent on the key value.

* * * * *